US012784969B2

(12) United States Patent
Yoshida et al.

(10) Patent No.: US 12,784,969 B2
(45) Date of Patent: Nov. 3, 2026

(54) COIL COMPONENT

(71) Applicant: TAIYO YUDEN CO., LTD., Tokyo (JP)

(72) Inventors: Kazuki Yoshida, Tokyo (JP); Takayuki Arai, Tokyo (JP)

(73) Assignee: TAIYO YUDEN CO., LTD., Tokyo (JP)

( * ) Notice: Subject to any disclaimer, the term of this patent is extended or adjusted under 35 U.S.C. 154(b) by 759 days.

(21) Appl. No.: 18/187,921

(22) Filed: Mar. 22, 2023

(65) Prior Publication Data

US 2023/0326669 A1 Oct. 12, 2023

(30) Foreign Application Priority Data

Mar. 31, 2022 (JP) ................................ 2022-058367

(51) Int. Cl.

*H01F 17/04* (2006.01)
*H01F 3/08* (2006.01)
*H01F 27/30* (2006.01)
*H01F 27/32* (2006.01)
*H01F 41/02* (2006.01)
*H01F 41/06* (2016.01)

(52) U.S. Cl.

CPC ............ *H01F 27/306* (2013.01); *H01F 3/08* (2013.01); *H01F 27/324* (2013.01); *H01F 41/0246* (2013.01); *H01F 41/06* (2013.01)

(58) Field of Classification Search

CPC ........ H01F 17/045; H01F 27/306; H01F 3/08; H01F 27/324; H01F 27/2823; H01F 27/2828; H01F 27/24; H01F 41/0246; H01F 41/06

USPC .................................................. 336/83, 192

See application file for complete search history.

(56) References Cited

U.S. PATENT DOCUMENTS

2013/0154784 A1* 6/2013 Hachiya ................. H01F 5/003 336/200
2017/0092411 A1* 3/2017 Shimizu ............. H01F 41/0206
(Continued)

FOREIGN PATENT DOCUMENTS

JP 2011-014822 A 1/2011
JP 2013-045926 A 3/2013

OTHER PUBLICATIONS

Notice of Reasons for Refusal dated Feb. 10, 2026, issued in corresponding Japanese Patent Application No. 2022-058367, with English machine translation (9 pgs.).

*Primary Examiner* — Tszfung J Chan
(74) *Attorney, Agent, or Firm* — CUSHMAN PARTNERS, LLC

(57) ABSTRACT

One object is to improve the electrical insulation between a conducting wire and a dust core without forming an insulating layer such as a glass layer on the dust core. A coil component includes: a dust core including a first flange, a second flange, and a winding core, the first flange having an inside surface including a first surface and a second surface, the second flange being opposed to the inside surface of the first flange, the winding core extending in a core axis direction and connecting the first flange and the second flange, the dust core being formed of a plurality of metal magnetic particles bonded to each other via insulating material. The first surface may be less smooth than the second surface; and a conducting wire wound around the winding core so as to be in contact with the inside surface at the first surface.

13 Claims, 18 Drawing Sheets

(56) References Cited

U.S. PATENT DOCUMENTS

| | | | | |
|---|---|---|---|---|
| 2018/0005751 | A1* | 1/2018 | Igarashi | H01F 27/2828 |
| 2019/0318865 | A1* | 10/2019 | Mikogami | H01F 27/2828 |
| 2020/0105451 | A1* | 4/2020 | Horie | H01F 17/045 |
| 2020/0227197 | A1* | 7/2020 | Ochiai | H01F 41/0246 |

* cited by examiner

COIL COMPONENT

CROSS-REFERENCE TO RELATED APPLICATIONS

This application is based on and claims the benefit of priority from Japanese Patent Application Serial No. 2022-058367 (filed on Mar. 31, 2022), the contents of which are hereby incorporated by reference in their entirety.

TECHNICAL FIELD

The present disclosure relates to a coil component and a method of manufacturing the coil component.

BACKGROUND

A wire-wound coil component is conventional that includes a core and a conducting wire wound around the core. The core has a pair of flanges and a winding core that connects the pair of flanges. The surface of the conducting wire is coated with an insulating coating member.

The wire-wound coil component disclosed in Japanese Patent Application Publication No. 2011-014822 ("the '822 Publication") has a core peripherally coated with a glass layer. The glass layer is formed by applying a glass paste formed of glass powder mixed with a binder resin to the surface of the core. In the coil component of the '822 Publication, a glass layer coating the surface of the core increases the mechanical strength of the core and improves the insulation between the core and other members.

As disclosed in Japanese Patent Application Publication No. 2013-045926 ("the '926 Publication"), the core may be a molded body made by compression molding of metal magnetic particles (referred to as a "dust core"). Coil components with a dust core exhibit better magnetic saturation characteristics than coil components with a ferrite core. The '926 Publication discloses that a glass coating is formed on the surface of the dust core.

The conducting wire is wound around the winding core of the core using a winding machine, such as a spindle winding machine or a flyer winding machine. When the conducting wire is wound around the winding core, the conducting wire may contact with the inner surface of a flange, damaging the coating material on the surface of the conducting wire and degrading the insulation of the conducting wire at the damaged area. Since the specific resistance of a dust core is lower than that of a ferrite core, if the coating material of a conducting wire is partly damaged, current tends to leak from the conducting wire to the dust core through the damaged area.

In the '822 Publication and the '926 Publication, it is proposed to coat the surface of the core with a glass layer to ensure the insulation of the core. However, since the glass slurry, which is the material for the glass layer, penetrates into the core through the grain boundaries of the ferrite grains and the gaps between the metal magnetic particles in the core, the glass slurry is applied to the surface of the core to a large thickness so that even if part of it penetrates into the core, the remaining part can remain on the surface of the core and serve as an insulating layer. In a dust core, a larger amount of glass slurry penetrates into the core, and therefore, it is particularly difficult to adjust the amount of glass slurry applied. To ensure the insulation of the dust core, a larger amount of glass slurry needs to be applied, and thus a thick glass layer is formed on the surface of the dust core, resulting in an increase of the size of the coil component by the thickness of the glass layer.

SUMMARY

One object of the present disclosure is to overcome or reduce at least a part of the above drawback. One of specific objects of the present disclosure is to provide a novel coil component having an improved electrical insulation between the conducting wire and the dust core and a method of manufacturing the same. One of more specific objects of the present disclosure is to improve the electrical insulation between the conducting wire and the dust core without forming an insulating layer such as a glass layer on the surface of the dust core.

Other objects of the disclosure will be made apparent through the entire description in the specification. The inventions recited in the claims may also address any other drawbacks in addition to the above drawback.

A coil component according to one embodiment of the invention comprises: a dust core including a first flange, a second flange, and a winding core, the first flange having an inside surface including a first surface and a second surface, the second flange being opposed to the inside surface of the first flange, the winding core extending in a core axis direction and connecting the first flange and the second flange, the dust core being formed of a plurality of metal magnetic particles bonded to each other via insulating material. The first surface may be less smooth than the second surface; and a conducting wire wound around the winding core so as to be in contact with the inside surface at the first surface.

A method of manufacturing a coil component according to one embodiment of the invention comprises: filling a filling space defined by an inner peripheral surface of a die and an upper end surface of a lower punch with a mixed resin composition formed by mixing soft magnetic metal powder and a resin; compressing the mixed resin composition by moving an upper punch having a sloping surface oblique to one axial direction toward the lower punch along the one axial direction, so as to obtain a compression-molded body having a first surface extending along the sloping surface and a second surface extending along the one axial direction, the first surface being less smooth than the second surface; heating the compression-molded body to obtain a dust core; and winding a conducting wire around the dust core so as to contact with the first surface.

A method of manufacturing a coil component according to one embodiment of the invention comprises: filling a cavity defined by an inner peripheral surface of a die and an upper end surface of a lower punch with a mixed resin composition formed by mixing soft magnetic metal powder and a resin; compressing the mixed resin composition by moving an upper punch having a first pressure surface and a second pressure surface positioned closer to the lower punch than is the first pressure surface toward the lower punch along one axial direction, so as to obtain a compression-molded body including a first region and a second region, the first region having a first surface compressed by the first pressure surface and extending along the one axial direction, the second region having a second surface compressed by the second pressure surface and extending along the one axial direction, the first surface being less smooth than the second surface; heating the compression-molded body to obtain a dust core; and winding a conducting wire around the dust core so as to contact with the first surface.

Advantageous Effects

According to the present disclosure, it is possible to improve the electrical insulation between the conducting wire and the dust core without forming an insulating layer such as a glass layer on the surface of the dust core.

DESCRIPTION OF THE PREFERRED EMBODIMENTS

Figure 1:
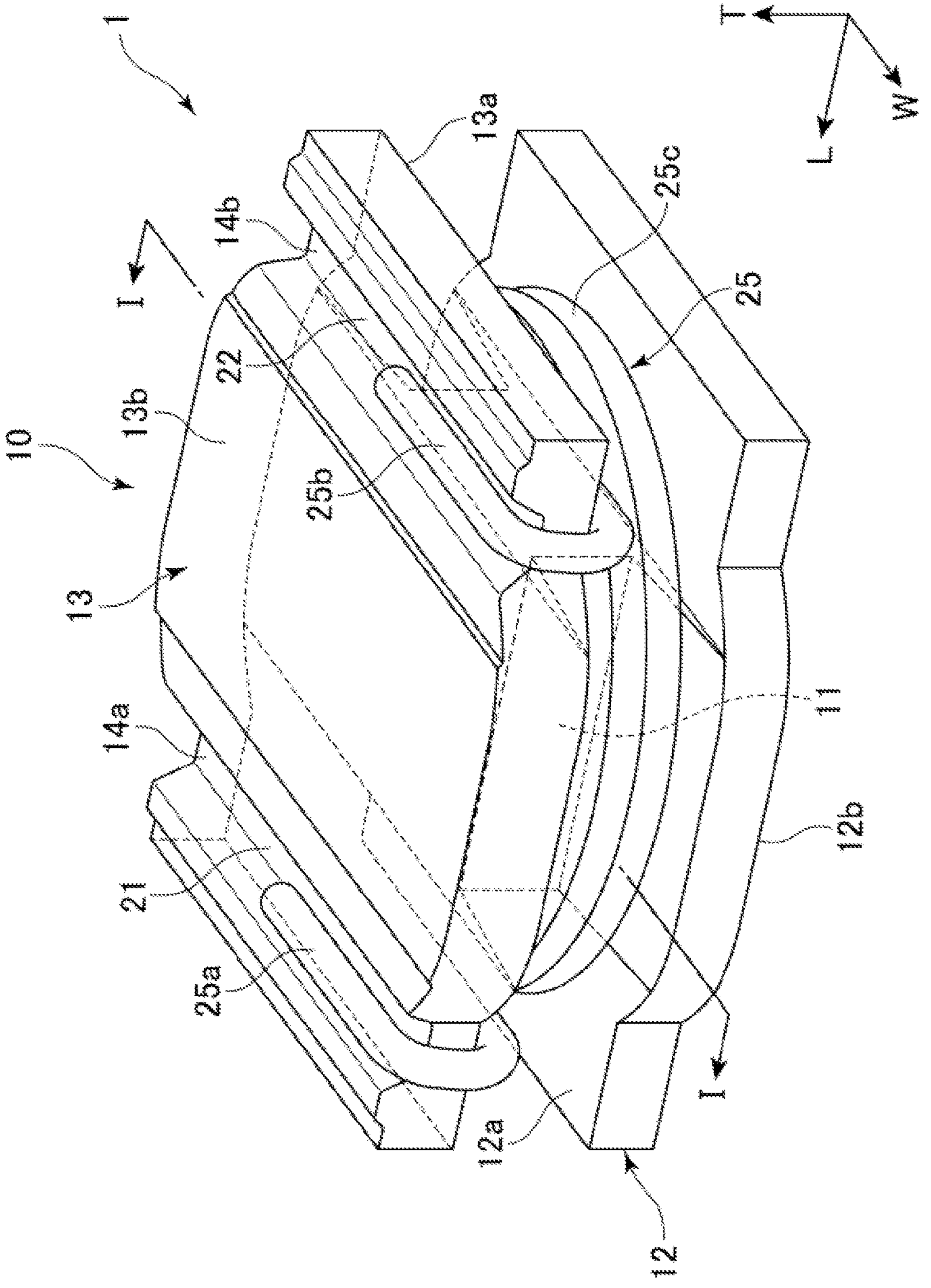
FIG. 1 is a perspective view of a coil component according to one embodiment of the invention.

Various embodiments of the present invention will be described hereinafter with reference to the appended drawings. Throughout the drawings, the same components are denoted by the same reference numerals. For convenience of explanation, the drawings are not necessarily drawn to scale. The following embodiments of the present invention do not limit the scope of the claims. The elements included in the following embodiments are not necessarily essential to solve the problem addressed by the invention.

FIGS. 1 to 5 show a coil component 1 according to one embodiment of the present invention. The coil component 1 is, for example, an inductor used to eliminate noise in an electronic circuit. The coil component 1 may be a power inductor built in a power supply line or an inductor used in a signal line.

Figure 2:
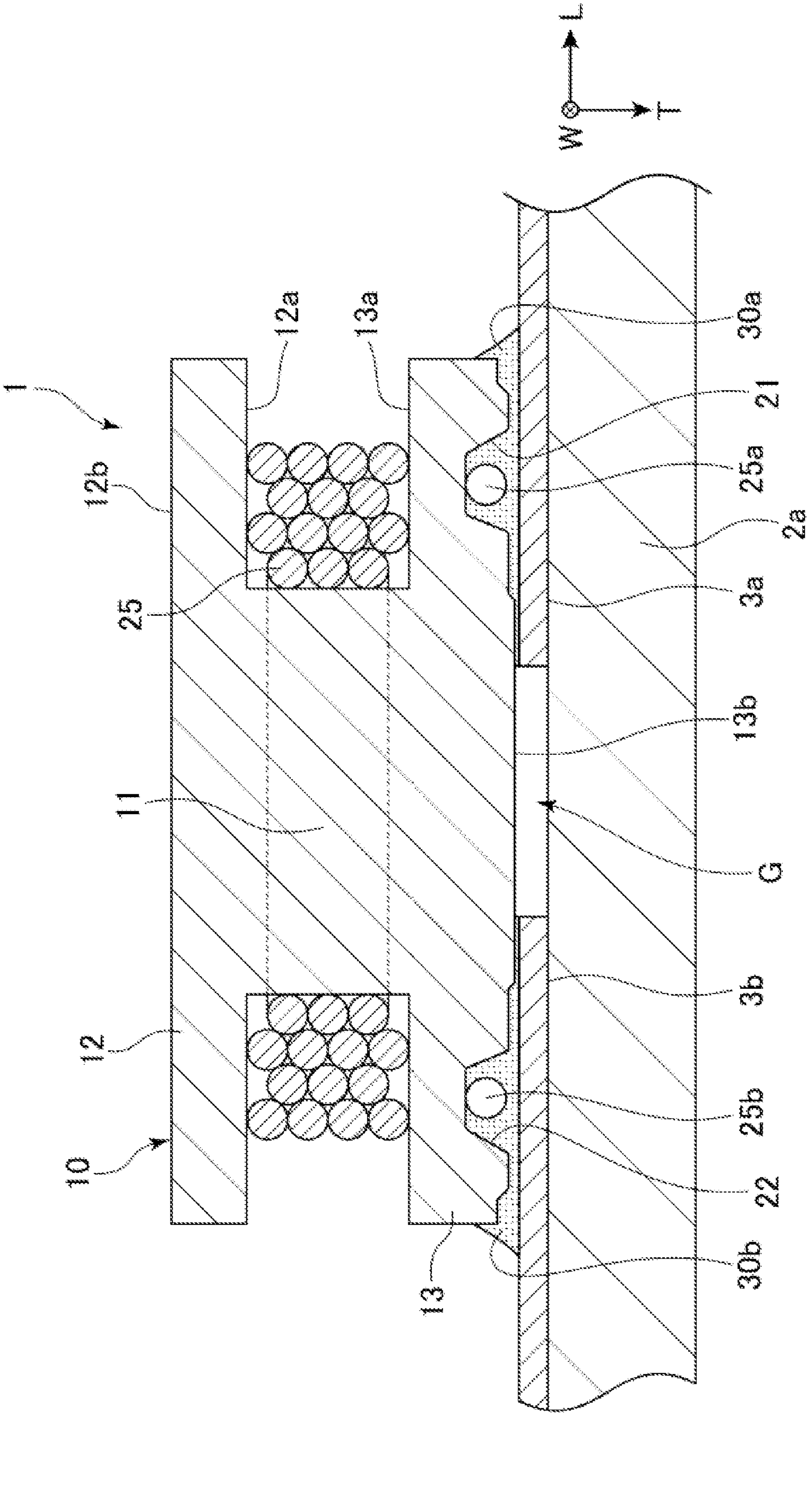
FIG. 2 is a longitudinal sectional view of the coil component of FIG. 1 mounted on a mounting board.

First, the coil component 1 is now briefly described with reference to FIGS. 1 and 2. FIG. 1 is a perspective view of the coil component 1 according to one embodiment of the present invention, and FIG. 2 is a longitudinal sectional view of the coil component 1 mounted on a mounting board 2*a*. In FIG. 1, the mounting board 2*a* is not shown.

As shown in FIG. 1, the coil component 1 includes a dust core 10 and a conducting wire provided on the dust core 10. The dust core 10 may be hereinafter referred to simply as "the core 10."

The drawings attached hereto show a W axis, an L axis, and a T axis orthogonal to one another. In this specification, a "length" direction, a "width" direction, and a "thickness" direction of the coil component 1 are referred to as an "L-axis" direction, a "W-axis" direction, and a "T-axis" direction in FIG. 1, respectively, unless otherwise construed from the context. Herein, orientations and arrangements of the constituent members of the coil component 1 may be described based on the L-, W- and T-axis directions.

The core 10 is made of a magnetic material containing metal magnetic particles by, for example, compression molding. The core 10 contains a large number of metal magnetic particles. In one aspect, adjacent metal magnetic particles in the core 10 are bonded to each other via insulating material. The insulating material is, for example, insulating films covering the surfaces of the metal magnetic particles. The insulating films on the surfaces of the metal magnetic particle include oxides of elements contained in the metal magnetic particles. In another aspect, the insulating material is an insulating binder formed of a thermosetting resin with excellent insulating characteristics, such as epoxy resin. The average particle size of the metal magnetic particles contained in the core 10 is, for example, 1 μm to 20 μm. The average particle size of the metal magnetic particles can be defined as the average particle size (median diameter (D50)) calculated from the volume-based particle size distribution.

The core 10 has a winding core 11 extending along the core axis direction, a first flange 12 shaped like a plate and provided at one end of the winding core 11, and a second flange 13 shaped like a plate and provided at the other end of the winding core 11. The winding core 11 connects the first flange 12 and the second flange 13. In the embodiment shown, the winding core 11 extends along the T-axis direction, and thus the core axis direction coincides with the T-axis direction.

In the embodiment shown, the winding core 11 has a quadrangular prism shape. The winding core 11 may have any shape suitable for winding thereon the conducting wire 25. For example, the winding core 11 may be formed in a polygonal prism shape such as a triangular prism shape, a pentagonal prism shape, or a hexagonal prism shape, a columnar shape, an elliptical columnar shape, or a truncated cone shape, instead of a quadrangular prism shape.

The first flange 12 has an inside surface 12*a* and an outside surface 12*b* opposite to the inside surface 12*a*. The second flange 13 has an inside surface 13*a* and an outside surface 13*b* opposite to the inside surface 13*a*. The inside surface 12*a* of the first flange 12 faces the inside surface 13*a* of the second flange 13.

In the embodiment shown, the outside surface 12*b* of the first flange 12 is a flat surface formed flat. The outside surface 13*b* of the second flange 13 has provided therein a first recess 14a and a second recess 14b extending along the W-axis direction. The first recess 14a is spaced apart from the second recess 14b in the L-axis direction. The surface of the first recess 14a has provided thereon an external electrode 21 made of a conductive material, and the surface of the second recess 14b has provided thereon an external electrode 22 made of a conductive material. Each of the external electrodes 21 and 22 may include a base layer made of a metal material such as copper, silver, palladium, or silver-palladium alloy and a plating layer provided on the base layer. The plating layer may be constituted by two layers including a nickel plating layer and a tin plating layer.

The conducting wire 25 is wound around the winding core 11. The conducting wire 25 is a metal wire made of a metal material having an excellent electrical conductivity peripherally provided with an insulation coating. The metal material used for the conducting wire 25 may be, for example, one or more of Cu, Al, Ni, and Ag or an alloy containing any of these metals. The insulation coating provided in the periphery of the conducting wire is formed of polyester imide, polyamide, or any other insulating material having excellent insulating characteristics. One end 25a of the conducting wire 25 is led out into the first recess 14a, and the other end 25b of the conducting wire 25 is led out into the second recess 14b. The one end 25a of the conducting wire 25 is in contact with the external electrode 21 provided on the bottom surface of the first recess 14a, and the other end 25b of the conducting wire 25 is in contact with the external electrode 22 provided on the bottom surface of the second recess 14b. The portion of the conducting wire 25 that is located around the winding core 11 may be herein referred to as a winding portion 25c. In the embodiment shown, the conducting wire 25 has a circular cross-sectional shape. The cross-sectional shape of the conducting wire 25 is not necessarily circular, but may be elliptic, oval, rectangular, or square.

As shown in FIG. 2, the coil component 1 may be mounted on the mounting board 2a. The coil component 1 may be bonded to a land 3a and a land 3b of the mounting board 2a by means of a solder portion 30a and a solder portion 30b, respectively. The solder portion 30a is provided on the core 10 so as to cover the one end 25a of the conducting wire 25, and the solder portion 30b is provided on the core 10 so as to cover the other end 25b of the conducting wire 25. A gap G is present between the lands 3a and 3b. The conducting wire 25 may be electrically connected to the land 3a via the solder portion 30a, or it may be in direct contact with the land 3a. Similarly, the conducting wire 25 may be electrically connected to the land 3b via the solder portion 30b, or it may be in direct contact with the land 3b.

The solder portion 30a may be formed as follows: a solder paste is filled into the first recess 14a, the solder paste is heated to produce a molten solder, and the molten solder is spread within the first recess 14a and then solidified. In one or more embodiments of the invention, the insulation coating provided on the conducting wire 25 is removed from the conducting wire 25 before the solder is filled into the first recess 14a. In the mounting operation, the insulation coating provided on the conducting wire 25 may be thermally decomposed by contact with the molten solder produced by the melting of the solder portion 30a, and thereby removed from the conducting wire 25. The solder paste may be made of any solder material. Examples of the solder material include lead-free alloy materials specified in JIS Z 3282. The solder paste may be applied into the first recess 14a by stencil printing, for example. The solder portion 30a may be formed by immersing the core 10 in a solder bath. The solder portion 30a may be formed as follows: a solder material is molded into a molded piece of the solder material using a die, the molded piece of the solder material is fitted into the first recess 14a along with the one end 25a of the conducting wire 25, and the molded piece of the solder material fitted into the first recess 14a is heated. The details of the method of forming the solder portion 30a are not limited to those explicitly disclosed herein. Similar to the solder portion 30a, the solder portion 30b is provided to be electrically connected to the other end 25b of the conducting wire 25 in the second recess 14b.

As described above, the coil component 1 is arranged such that the outside surface 13b of the second flange 13 of the core 10 faces the mounting board 2a, and is mounted on the mounting board 2a via the external electrodes 21, 22 and the solder portions 30a, 30b provided on the outside surface 13b. Therefore, the outside surface 13b of the second flange 13 is the mounting surface of the coil component 1.

Figure 3:
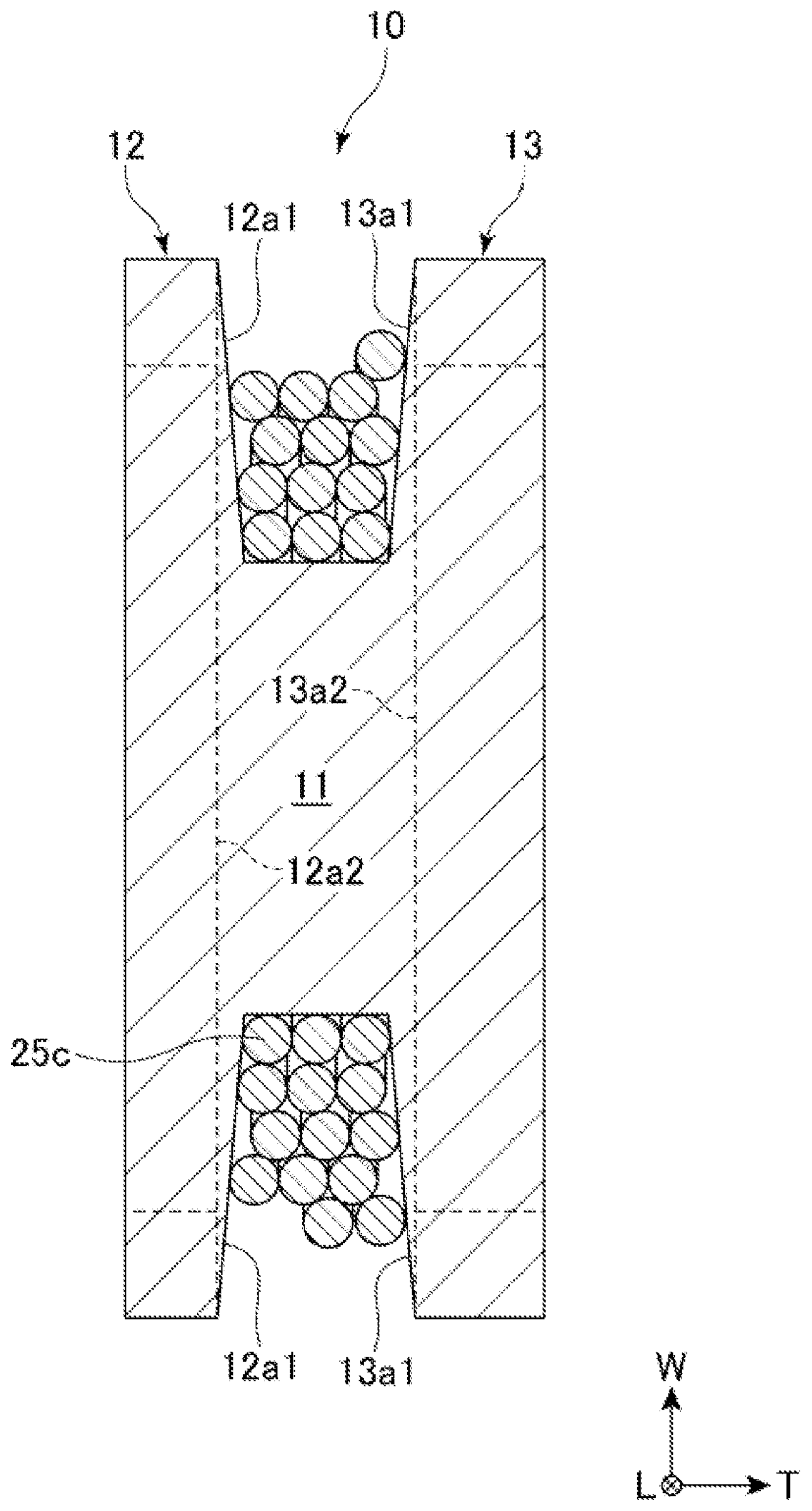
FIG. 3 is a sectional view of the coil component of FIG. 1 along the line I-I.
Figure 4:
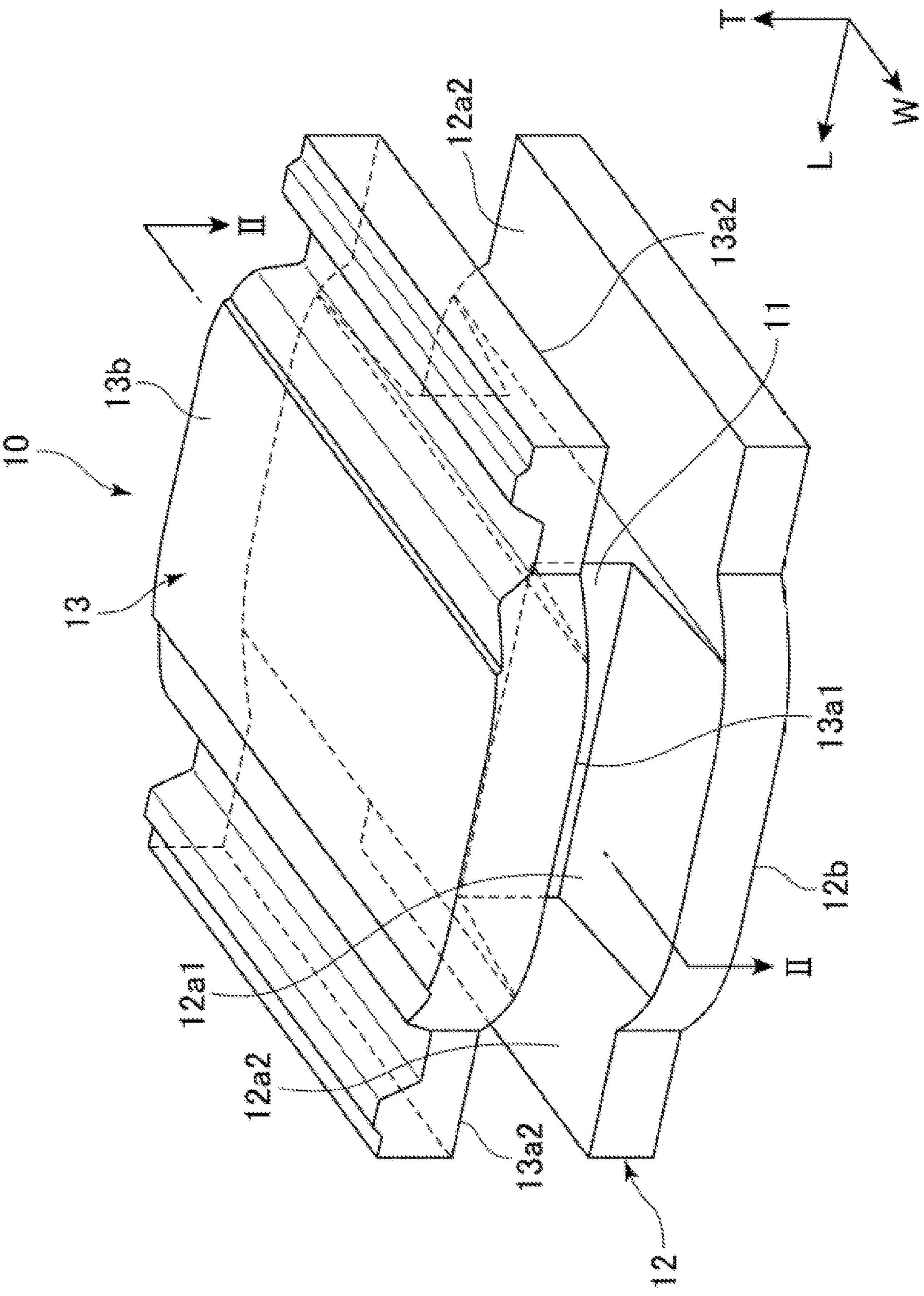
FIG. 4 is a perspective view showing a dust core included in the coil component shown in FIG. 1.
Figure 5:
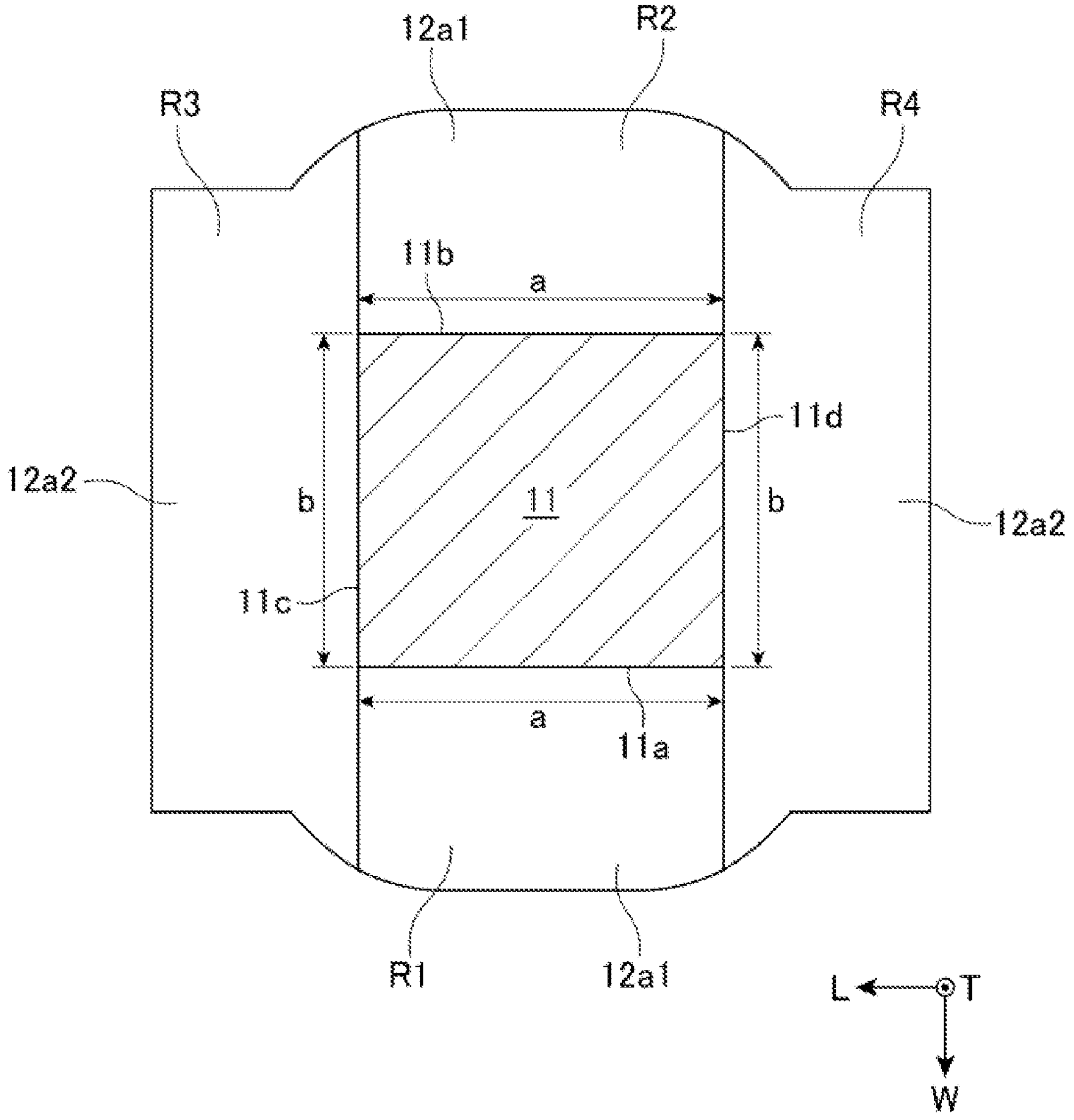
FIG. 5 is a sectional view of the dust core of FIG. 4 along the line II-II.

Next, with further reference to FIGS. 3 to 5, a description is given of the core 10. FIG. 3 is a sectional view of the coil component 1 of FIG. 2 cut along the cutting line I-I, FIG. 4 is a perspective view of the core 10 included in the coil component 1, and FIG. 5 is a sectional view of the core 10 cut along the cutting line II-II.

As shown in FIGS. 3 to 5, the inside surface 12a of the first flange 12 is divided into a first surface 12a1 and a second surface 12a2. The first surface 12a1 is less smooth than the second surface 12a2. In other words, the first surface 12a1 is rougher than the second surface 12a2. The smoothness of a surface of the core 10 is herein expressed by the arithmetic mean roughness Sa of the surface of the core 10. The arithmetic mean roughness Sa is calculated using a measuring instrument in conformity to ISO 25178. The arithmetic mean roughness Sa can be measured using a shape analysis laser microscope (VK-X250) from Keyence Corporation. Let the arithmetic mean roughness of the first surface 12a1 be the first Sa and the arithmetic mean roughness of the second surface 12a2 be the second Sa. Then, the first Sa is larger than the second Sa. In one aspect, the first Sa is two or more times as large as the second Sa. In one aspect, the first Sa is two to three times as large as the second Sa.

In one aspect, the outside surface 12b of the first flange 12 is less smooth than the second surface 12a2 of the inside surface 12a. Let the arithmetic mean roughness of the outside surface 12b be the third Sa. Then, the third Sa is larger than the second Sa. It is also possible that the smoothness of the outside surface 12b is about the same as the smoothness of the second surface 12a2. It is also possible that the third Sa, the arithmetic mean roughness of the outside surface 12b, may be smaller than the first Sa, the arithmetic mean roughness of the first surface 12a1 of the inside surface 12a.

In one aspect, the first Sa, the arithmetic mean roughness of the first surface 12a1, is 1/20 or larger of the average particle size of the metal magnetic particles in the core 10. Both the second Sa, the arithmetic mean roughness of the second surface 12a2, and the third Sa, the arithmetic mean roughness of the outside surface 12b, are smaller than 1/20 of the average particle size of the metal magnetic particles in the core 10. The first Sa, the arithmetic mean roughness of the first surface 12a1, is from 0.3 μm to 1 μm, for example. The second Sa, the arithmetic mean roughness of the second surface 12a2, is from 0.1 μm to 0.3 μm, for example. The third Sa, the arithmetic mean roughness of the outside surface 12b, is from 0.2 μm to 0.6 μm, for example. Since the first Sa, the arithmetic mean roughness of the first surface 12*a*1, is larger than the second Sa, the arithmetic mean roughness of the second surface 12*a*2, the surface resistance of the first surface 12*a*1 per unit length is larger than the surface resistance of the second surface 12*a*2 per unit length. The surface resistance of the surfaces of the core 10 can be measured using a commercially available contact-type resistance measuring instrument in conformity to JIS C-2139-3-2. The surface resistance of the surfaces of the core 10 can be measured using a super-insulation meter (SM8203) from DKK-TOA Corporation. Likewise, since the third Sa, the arithmetic mean roughness of the outside surface 12*b*, is larger than the second Sa, the arithmetic mean roughness of the second surface 12*a*2, the surface resistance of the outside surface 12*b* per unit length is larger than the surface resistance of the second surface 12*a*2 per unit length. The surface resistance of the first surface 12*a*1 may be from 1,000 MSZ/cm to 10,000 MSZ/cm. The surface resistance of the second surface 12*a*2 may be from 100 MSZ/cm to less than 1,000 MSZ/cm. The surface resistance of the outside surface 12*b* may be from 500 MSZ/cm to less than 5,000 MSZ/cm.

As with the inside surface 12*a* of the first flange 12, the inside surface 13*a* of the second flange 13 is divided into a first surface 13*a*1 and a second surface 13*a*2. The first surface 13*a*1 is less smooth than the second surface 13*a*2. The first surface 13*a*1 of the inside surface 13*a* of the second flange 13 is positioned to face the first surface 12*a*1 of the inside surface 12*a* of the first flange 12, and the second surface 13*a*2 of the inside surface 13*a* of the second flange 13 is positioned to face the second surface 12*a*2 of the inside surface 12*a* of the first flange 12. In one aspect, the outside surface 13*b* of the second flange 13 is less smooth than the second surface 13*a*2 of the inside surface 13*a*. Since the arithmetic mean roughness of the first surface 13*a*1 is larger than the arithmetic mean roughness of the second surface 13*a*2, the surface resistance of the first surface 13*a*1 per unit length is larger than the surface resistance of the second surface 13*a*2 per unit length. Likewise, the arithmetic mean roughness of the outside surface 13*b* is larger than the arithmetic mean roughness of the second surface 13*a*2, the surface resistance of the outside surface 13*b* per unit length is larger than the surface resistance of the second surface 13*a*2 per unit length.

For simplicity, the description herein is primarily focused on the first flange 12, but the description of the first flange 12 applies to the second flange 13 to the extent possible.

As shown in FIGS. 3 and 4, the first surface 12*a*1 is positioned closer to the second flange 13 than is the second surface 12*a*2 in the T-axis direction. The first surface 12*a*1 rises from the inside surface 12*a* of the first flange 12 toward the second flange 13. In the embodiment shown, the second surface 12*a*2 extends in a direction perpendicular to the core axis direction (the T-axis direction). In other words, the second surface 12*a*2 extends parallel to the LW plane perpendicular to the core axis direction. In the embodiment shown, the first surface 12*a*1 is oblique to the second surface 12*a*2. As shown, the first surface 12*a*1 may be oblique to the second surface 12*a*2 such that it is farthest from the second surface 12*a*2 at the connection position with the winding core 11. Both the first surface 12*a*1 and the second surface 12*a*2 are flat.

Likewise, in the second flange 13, the first surface 13*a*1 is positioned closer to the first flange 12 than is the second surface 13*a*2 in the T-axis direction. The first surface 13*a*1 rises from the inside surface 13*a* of the second flange 13 toward the first flange 12. In the embodiment shown, the second surface 13*a*2 extends in a direction perpendicular to the core axis direction (the T-axis direction). In other words, the second surface 13*a*2 extends parallel to the LW plane perpendicular to the core axis direction. In the embodiment shown, the first surface 13*a*1 is oblique to the second surface 13*a*2. As shown, the first surface 13*a*1 may be oblique to the second surface 13*a*2 such that it is farthest from the second surface 13*a*2 at the connection position with the winding core 11. Both the first surface 13*a*1 and the second surface 13*a*2 are flat.

As shown in FIG. 5, the inside surface 12*a* of the first flange 12 is divided into the following regions when viewed from the core axis direction (T-axis direction): the first region R1 on the positive side of the winding core 11 in the W-axis direction; the second region R2 on the negative side of the winding core 11 in the W-axis direction; the third region R3 on the positive side of the winding core 11 in the L-axis direction; and the fourth region R4 on the negative side of the winding core 11 in the L-axis direction. Of these regions, the first region R1 and the second region R2 constitute the first surface 12*a*1, and the third region R3 and the fourth region R4 constitute the second surface 12*a*2. In other words, the first surface 12*a*1 is divided into the first region R1 and the second region R2, and the second surface 12*a*2 is divided into the third region R3 and the fourth region R4. The region R1 is in contact with the third region R3 and the fourth region R4 in the L-axis direction. Likewise, the region R2 is also in contact with the third region R3 and the fourth region R4 in the L-axis direction.

The outer peripheral surface of the winding core 11 is defined by a first peripheral surface 11*a*, a second peripheral surface 11*b* opposed to the first peripheral surface 11*a*, a third peripheral surface 11*c* connecting the first peripheral surface 11*a* and the second peripheral surface 11*b*, and a fourth peripheral surface 11*d* opposed to the third peripheral surface 11*c*. The first region R1 of the first surface 12*a*1 of the first flange 12 is in contact with the first peripheral surface 11*a* of the winding core 11, and the second region R2 is in contact with the second peripheral surface 11*b* of the winding core 11. In the embodiment shown, the dimension of the first peripheral surface 11*a* of the winding core 11 in the L-axis direction (=a) is equal to the dimension of the second peripheral surface 11*b* in the L-axis direction (=a). In one aspect, the dimension of the first surface 12*a*1 of the first flange 12 in the L-axis direction is equal to the dimension of the first peripheral surface 11*a* of the winding core 11 in the L-axis direction and the dimension of the second peripheral surface 11*b* of the winding core 11 in the L-axis direction. Thus, the first surface 12*a*1 is in contact with the winding core over a length of 2*a*.

In one aspect, the third region R3 of the second surface 12*a*2 of the first flange 12 is in contact with the third peripheral surface 11*c* of the winding core 11, and the fourth region R4 is in contact with the fourth peripheral surface 11*d* of the winding core 11. In the embodiment shown, the dimension of the third peripheral surface 11*c* of the winding core 11 in the W-axis direction (=b) is equal to the dimension of the fourth peripheral surface 11*d* in the W-axis direction (=b). Thus, the second surface 12*a*2 is in contact with the winding core over a length of 2*b*.

In one aspect, the area of the second surface 12*a*2 of the first flange 12 (i.e., the sum of the area of the region R3 and the area of the region R4) is larger than the area of the first surface 12*a*1 (i.e., the sum of the area of the region R1 and the area of the region R2).

In manufacturing the coil component 1, the core 10 is formed of a magnetic material containing metal magnetic particles by the compression molding, and then the conducting wire 25 is wound around the winding core 11 of the core 10. The conducting wire 25 is wound around the winding core 11 using a commercially available spindle winding machine, a commercially available flyer winding machine, or any other known winding machine.

As shown in FIG. 3, in the core 10, the first surface **12*a*1 in the inside surface 12*a* of the first flange 12 projects toward the second flange 13, and therefore, the conducting wire 25 is in contact with the first surface 12*a*1 in the inside surface 12*a* of the first flange 12. In one aspect, the second surface 12*a*2 is set back from the first surface 12*a*1 in the T-axis direction, and thus the conducting wire 25 is not in contact with the second surface 12*a*2. Therefore, of the inside surface 12*a* of the first flange 12, only the first surface 12*a*1 is in contact with the conducting wire 25**.

Likewise, in the core 10, the first surface **13*a*1 in the inside surface 13*a* of the second flange 13 projects toward the first flange 12, and therefore, the conducting wire 25 is in contact with the inside surface 13*a* of the second flange 13 at the first surface 13*a*1. In one aspect, the second surface 13*a*2 is set back from the first surface 13*a*1 in the T-axis direction, and thus the conducting wire 25 is not in contact with the second surface 13*a*2. Therefore, of the inside surface 13*a* of the second flange 13, only the first surface 13*a*1 is in contact with the conducting wire 25**.

When the conducting wire 25 is wound around the winding core 11 by a winding machine, the conducting wire is under tension because both ends of the conducting wire are pulled by the nozzles of the winding machine. Therefore, when the conducting wire 25 is wound around the winding core 11, contact between the conducting wire 25 and the inside surface **12*a* of the first flange 12 or the inside surface 13*a* of the second flange 13 may cause damage of the insulation coating provided on the surface of the conducting wire 25. The conducting wire 25 is in contact with the inside surface 12*a* of the first flange 12 at the first surface 12*a*1 only. As described above, the surface resistance of the first surface 12*a*1 is larger than that of the second surface 12*a*2, so that even if the coating material on the conducting wire 25 is damaged by friction with the inside surface 12*a* of the first flange 12 when the conducting wire 25 is wound around the winding core 11, the damaged part of the conducting wire 25 contacts with the inside surface 12*a* at the first surface 12*a*1 having a large surface resistance, and therefore, leakage of current can be inhibited between the conducting wire 25 and the first flange 12 through the damaged part of the coating material on the conducting wire 25. Likewise, the conducting wire 25 contacts with the inside surface 13*a* of the second flange 13 at the first surface 13*a*1 only, and therefore, leakage of current can be inhibited between the conducting wire 25 and the second flange 13 through the damaged part of the coating material on the conducting wire 25**.

Figure 6:
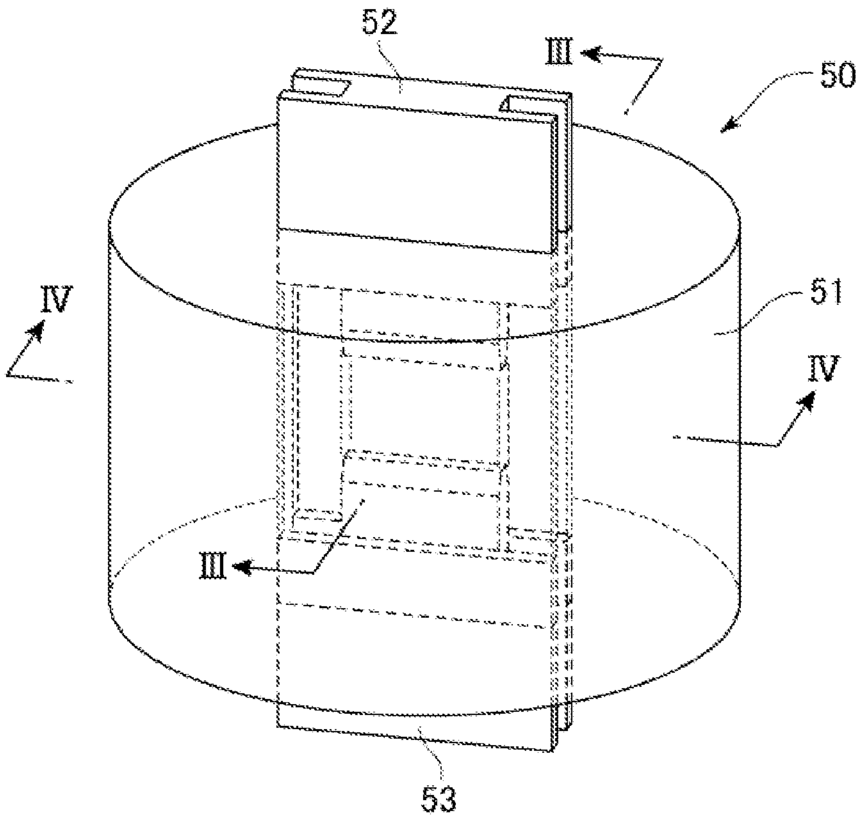
FIG. 6 schematically shows a uniaxial pressing machine used for manufacturing the dust core shown in FIG. 4.
Figure 7:
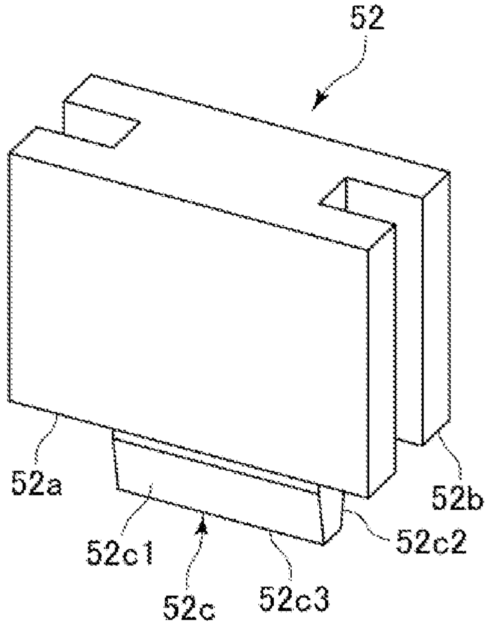
FIG. 7 schematically shows an upper punch of the uniaxial pressing machine of FIG. 6.

The core 10 may be produced by uniaxial pressing. FIG. 6 schematically shows a uniaxial pressing machine used for producing the core 10, and FIG. 7 schematically shows an upper punch 52 of the uniaxial pressing machine. As shown, the uniaxial pressing machine 50 includes a die 51 with a through hole, an upper punch 52, and a lower punch 53.

As shown in FIG. 7, the upper punch 52 has a flat first pressure surface **52*a*, a flat second pressure surface 52*b*, a first sloping surface 52*c*1 provided on a projection 52*c* projecting downward, a second sloping surface 52*c*2 provided on the projection 52*c*, and a flat third pressure surface 52*c*3 connecting the first sloping surface 52*c*1 and the second sloping surface 52*c*2. The first sloping surface 52*c*1 is at an angle larger than 1° C. with respect to the stroke direction (the vertical direction in FIGS. 8A to 8C referred to later). Likewise, the second sloping surface 52*c*2 is at an angle larger than 1° C. with respect to the stroke direction. The lower punch 53 has the same shape as the upper punch 52. Specifically, the lower punch 53 has a first pressure surface 53*a* shaped flat, a second pressure surface 53*b* shaped flat, a first sloping surface 53*c*1 provided on a projection 53*c* projecting upward, a second sloping surface 53*c*2 provided on the projection 53*c*, and a third pressure surface 53*c*3 shaped flat and connecting the first sloping surface 53*c*1 and the second sloping surface 53*c*2. The lower punch 53 is installed in the through hole of the die 51 so as to be vertically opposed to the upper punch 52. The upper punch 52 and the lower punch 53 are movable in the stroke direction. The stroke direction of the upper punch 52 and the lower punch 53** is the vertical direction in the drawings.

Figure 8A:
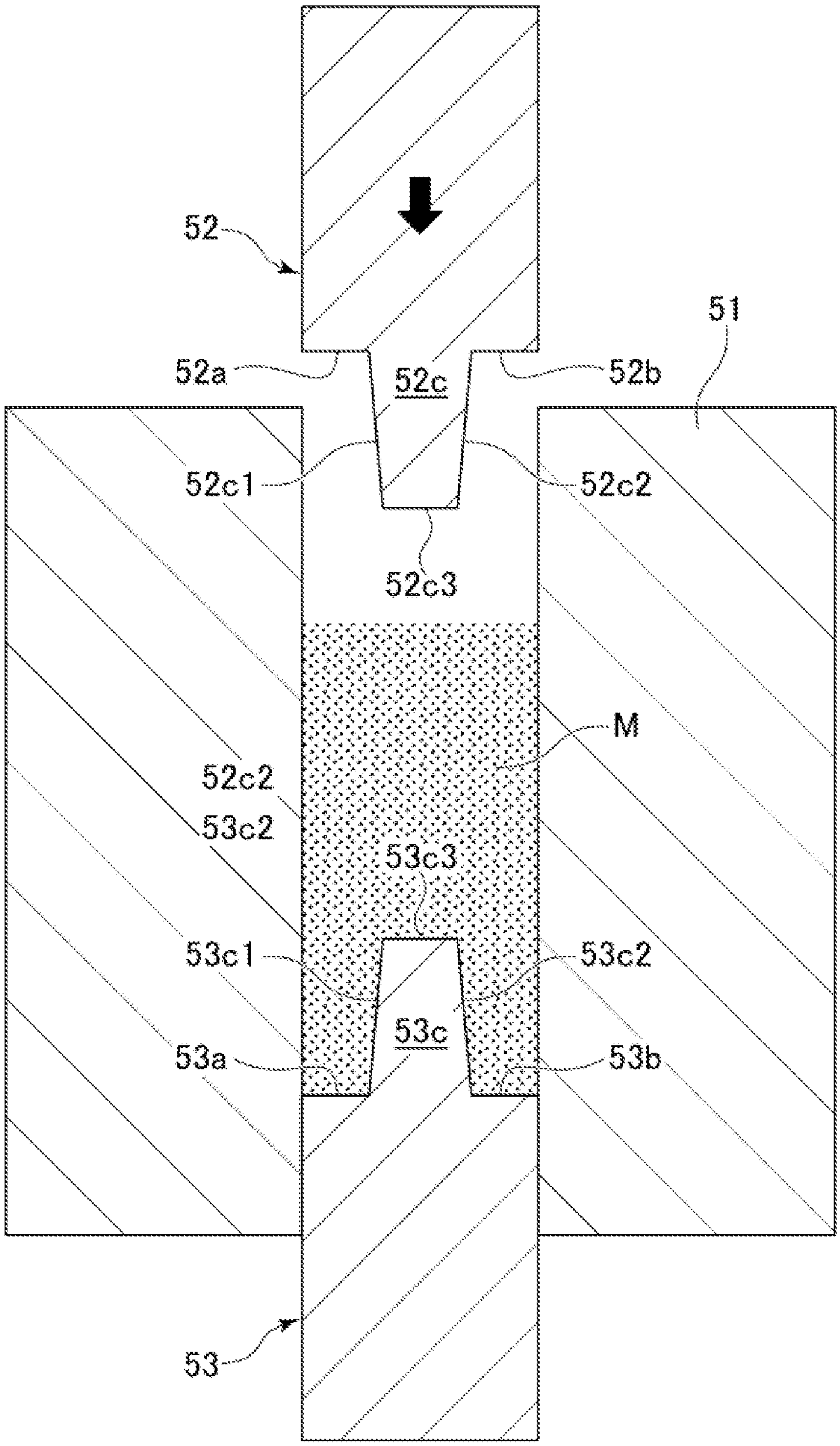
FIG. 8A is a schematic view for explaining a method of manufacturing the dust core shown in FIG. 4.
Figure 8B:
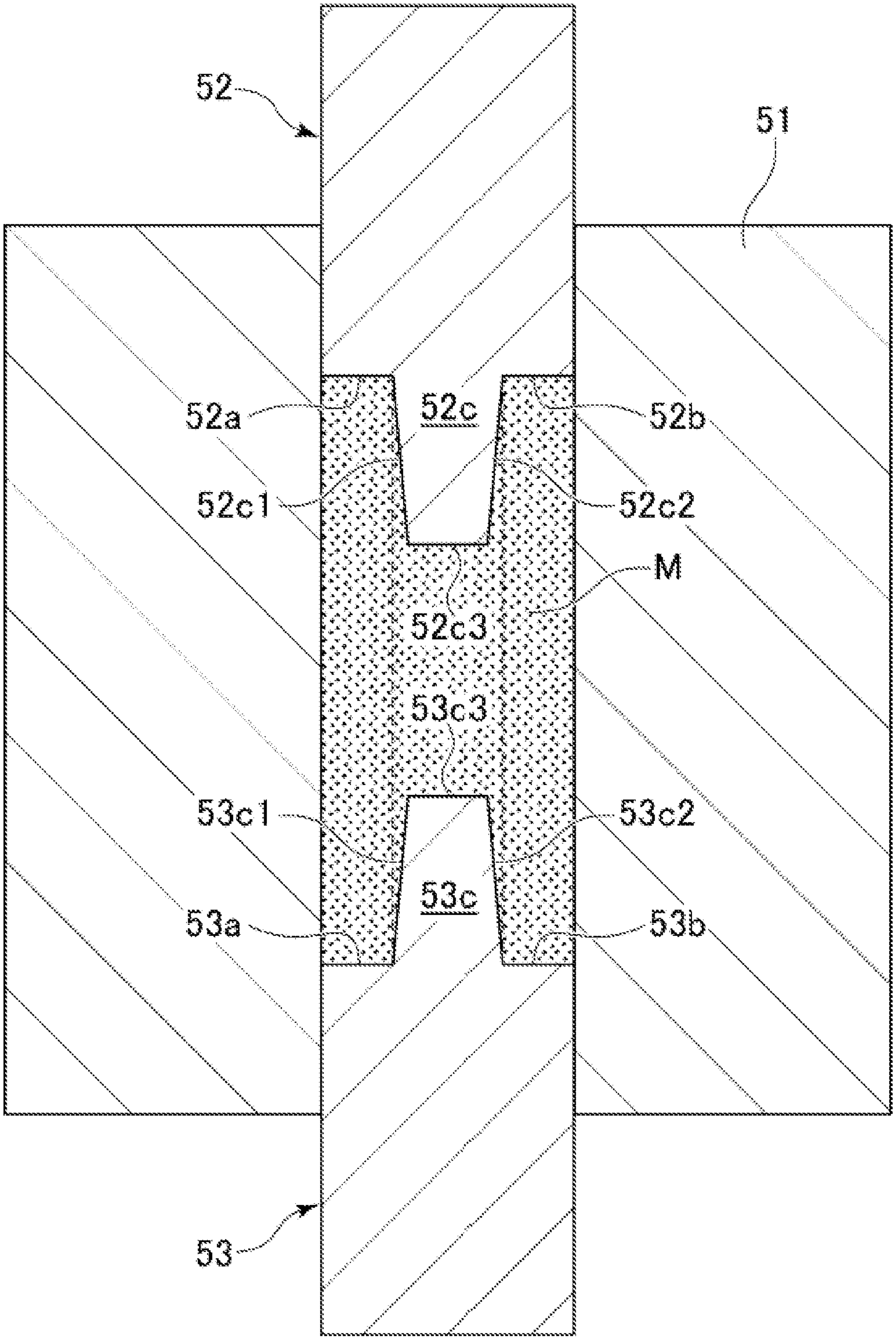
FIG. 8B is a schematic view for explaining the method of manufacturing the dust core shown in FIG. 4.
Figure 8C:
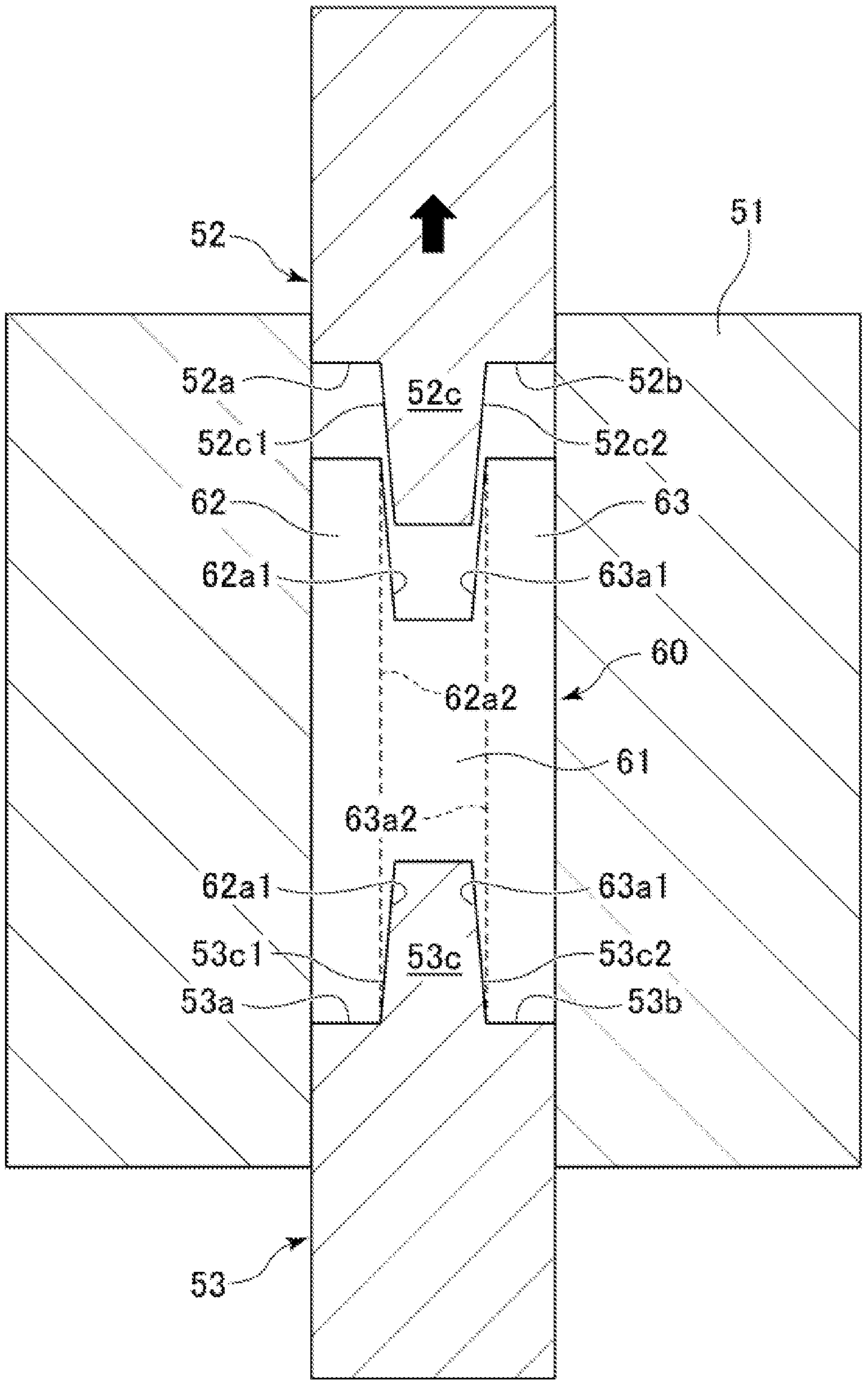
FIG. 8C is a schematic view for explaining the method of manufacturing the dust core shown in FIG. 4.

The method of manufacturing the core 10 will now be described with reference to FIGS. 8A to 8C. FIGS. 8A to 8C schematically show a section of the uniaxial pressing machine 50 cut along the line III-III of FIG. 6. First, as shown in FIG. 8A, a magnetic material M is filled into the filling space defined by the inner peripheral surface of the die 51 and the upper end surface of the lower punch 53. The magnetic material M is a mixed resin composition formed by mixing soft magnetic metal powder and a resin.

Next, the magnetic material M filled in the filling space is pressurized by the lower punch 53 and the upper punch 52. Specifically, the upper punch 52 is lowered to the position shown in FIG. 8B, such that the magnetic material M is pressurized by the lower punch 53, the upper punch 52, and the die 51, and then the upper punch 52 is raised. Thus, a molded body 60 is obtained which has a shape corresponding to the core 10, as shown in FIG. 8C. The molded body 60 contains a plurality of metal magnetic particles. The molded body 60 includes a winding core portion 61 corresponding to the winding core 11, a first flange portion 62 corresponding to the first flange 12, and a second flange portion 63 corresponding to the second flange 13. The first flange portion 62 has a sloping surface **62*a*1 corresponding to the first sloping surface 52*c*1 of the upper punch 52 and the first sloping surface 53*c*1 of the lower punch 53 and a flat surface 62*a*2 extending along the stroke direction. The second flange portion 63 has a sloping surface 63*a*1 corresponding to the second sloping surface 52*c*2 of the upper punch 52 and the second sloping surface 53*c*2 of the lower punch 53 and a flat surface 63*a*2** extending along the stroke direction.

The molded body 60 is taken out of the uniaxial pressing machine 50 and then heated to obtain the core 10. Through this heat treatment, the winding core portion 61 of the molded body 60 is formed into the winding core 11, the first flange portion 62 is formed into the first flange 12, and the second flange portion 63 is formed into the second flange 13. The heat treatment on the molded body 60 is performed at a temperature of 600° C. to 850° C. for a duration of 30 to 240 minutes, for example.

Figure 9A:
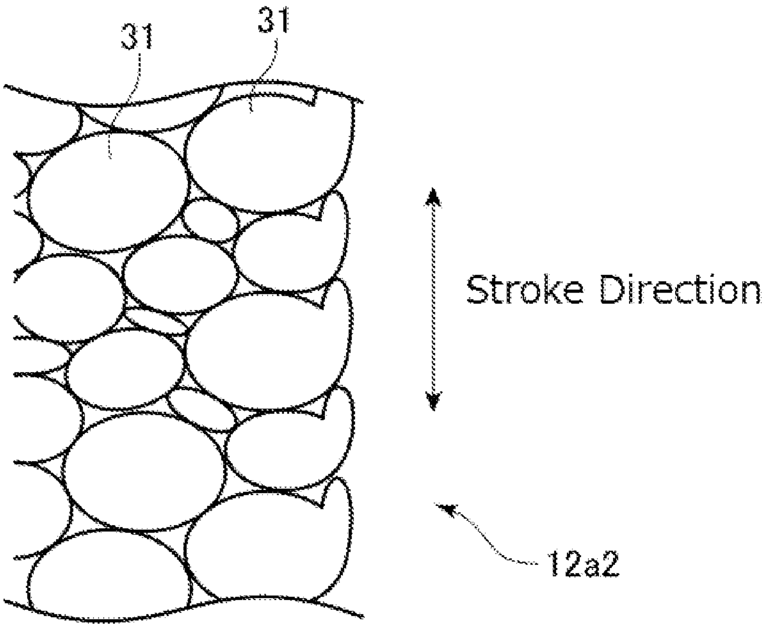
FIG. 9A schematically shows fine structure of a second surface of the dust core shown in FIG. 4.

In the above manufacturing process, when the upper punch 52 is raised after pressurizing the magnetic material M, a frictional force acts on the flat surface **62*a*2 of the molded body 60 from the molding surface of the upper punch 52 extending along the stroke direction. Of the plurality of metal magnetic particles contained in the molded body 60, the metal magnetic particles exposed from the flat surface 62*a*2 is deformed in the stroke direction under the frictional force. As a result, as shown in FIG. 9A, in the core 10, the metal magnetic particles 31 exposed from the second surface 12$a$2 of the first flange 12 have a larger amount of deformation along the stroke direction than the metal magnetic particles 31 inside the core 10. Thus, the frictional force acting when the upper punch 52 is raised after pressurization causes the metal magnetic particles 31 exposed from the flat surface 62$a$2 of the molded body 60 to deform along the stroke direction, resulting in smaller unevenness in the flat surface 62$a$2 caused by the shapes of the metal magnetic particles 31. Therefore, the flat surface 62$a$2 of the molded body 60, and thus the second surface 12$a$2 of the first flange 12 of the core 10, is highly smooth. For the same reason, the second surface 13$a$2 of the second flange 13 of the core 10** is also highly smooth.

Figure 9B:
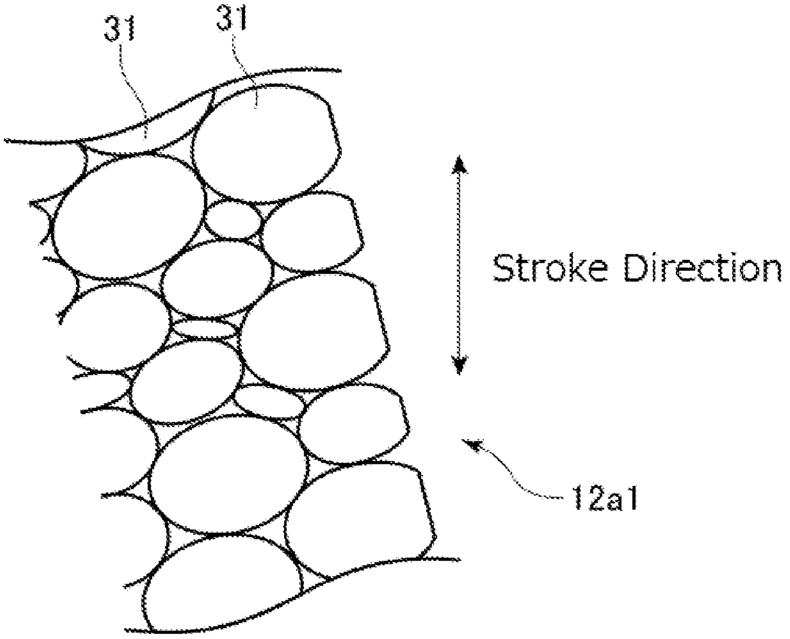
FIG. 9B schematically shows fine structure of a first surface of the dust core shown in FIG. 4.

On the other hand, the sloping surface 62$a$1 is oblique to the stroke direction, and thus no frictional force from the upper punch 52 acts on the sloping surface 62$a$1 when the upper punch 52 is raised. Accordingly, when the upper punch 52 is raised, the unevenness of the metal magnetic particles is preserved in the sloping surface 62$a$1. As a result, as shown in FIG. 9B, in the core 10, the metal magnetic particles 31 exposed from the first surface 12$a$1 of the first flange 12 are less deformed than the metal magnetic particles 31 exposed from the second surface 12$a$2. Therefore, the sloping surface 62$a$1 of the molded body 60, and thus the first surface 12$a$1 of the first flange 12 of the core 10, is less smooth than the second surface 12$a$2. For the same reason, the first surface 13$a$1 of the second flange 13 of the core 10 is also less smooth than the second surface 13$a$2.

Figure 10:
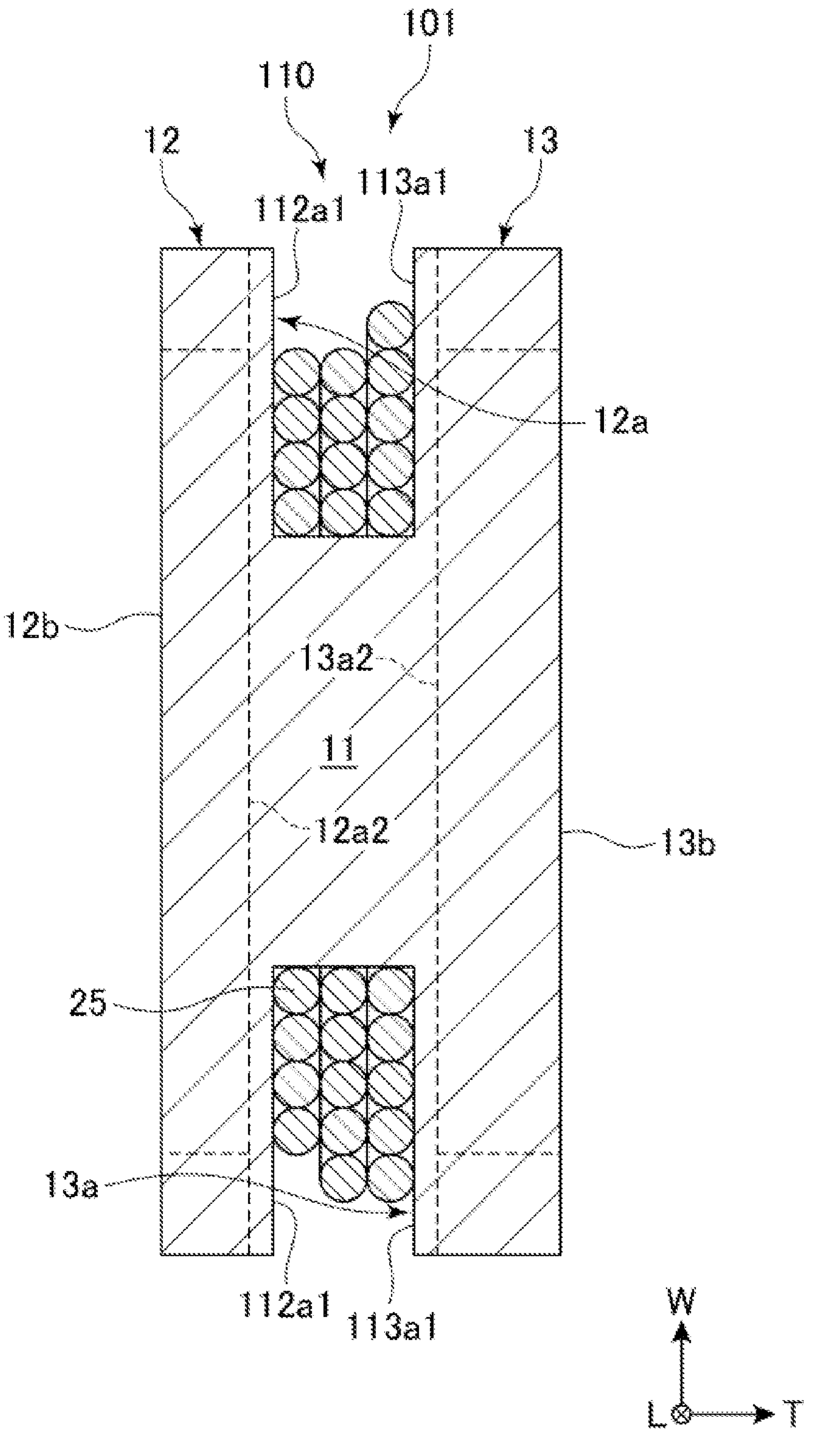
FIG. 10 is a sectional view of a coil component according to another embodiment of the invention.
Figure 11:
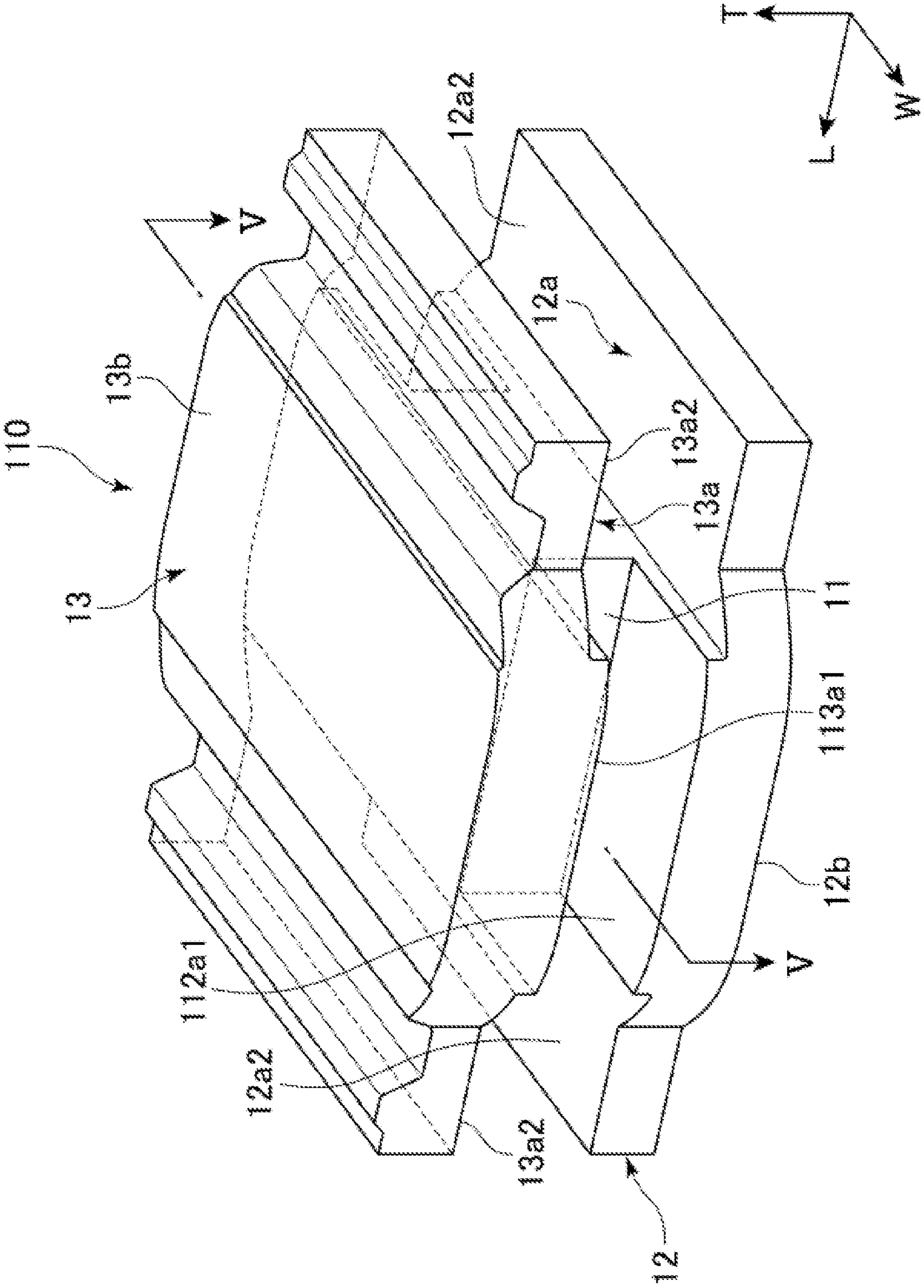
FIG. 11 is a perspective view showing a dust core included in the coil component shown in FIG. 10.
Figure 12:
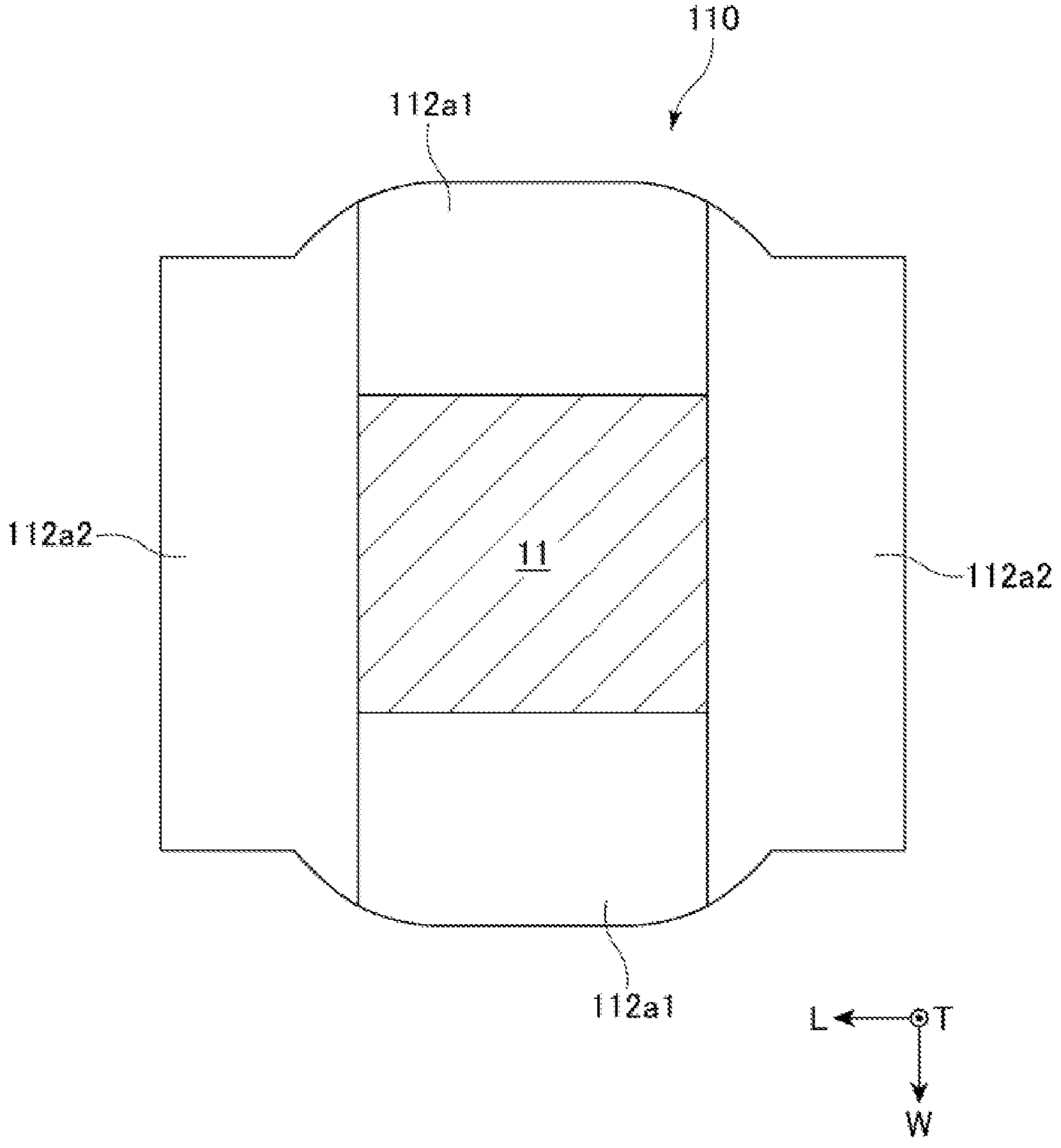
FIG. 12 is a sectional view of the dust core of FIG. 11 along the line V-V.

Next, with reference to FIGS. 10 to 12, a description is given of a coil component 101 according to another embodiment. The coil component 101 is different from the coil component 1 in that it includes a core 110 instead of the core 10. Since the coil component 1 and the coil component 101 share common features except for the shape of the core, the following description will focus on the core 110 and will not refer to the common features.

As shown in FIGS. 10 and 11, the first flange 12 of the core 110 has an inside surface 12$a$ and an outside surface 12$b$. The inside surface 12$a$ of the first flange 12 is divided into a first surface 112$a$1 and a second surface 12$a$2. Unlike the first surface 12$a$1, the first surface 112$a$1 extends parallel to the second surface 12$a$2. The first surface 112$a$1 is less smooth than the second surface 12$a$2. The description regarding the smoothness of the first surface 12$a$1 of the coil component 1 also applies to the smoothness of the first surface 112$a$1.

FIG. 12 is a sectional view of the core 110 cut along the cutting line V-V. As shown in FIG. 12, the arrangement of the first surface 112$a$1 viewed from the T-axis direction is the same as that of the first surface 12$a$1.

The second flange 13 of the core 110 has an inside surface 13$a$ and an outside surface 13$b$. The inside surface 13$a$ of the second flange 13 is divided into a first surface 113$a$1 and a second surface 13$a$2. Unlike the first surface 13$a$1, the first surface 113$a$1 extends parallel to the second surface 13$a$2. The first surface 113$a$1 is less smooth than the second surface 13$a$2. The description regarding the smoothness of the first surface 13$a$1 of the coil component 1 also applies to the smoothness of the first surface 113$a$1.

Figure 13:
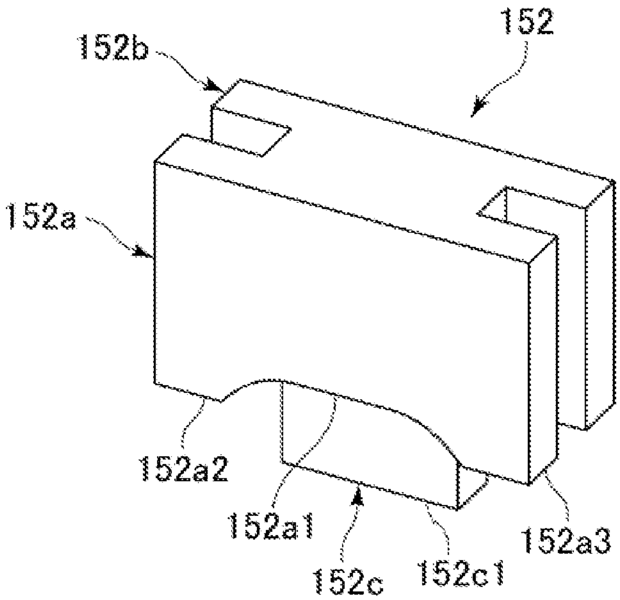
FIG. 13 schematically shows a die used for manufacturing the dust core shown in FIG. 11.
Figure 14A:
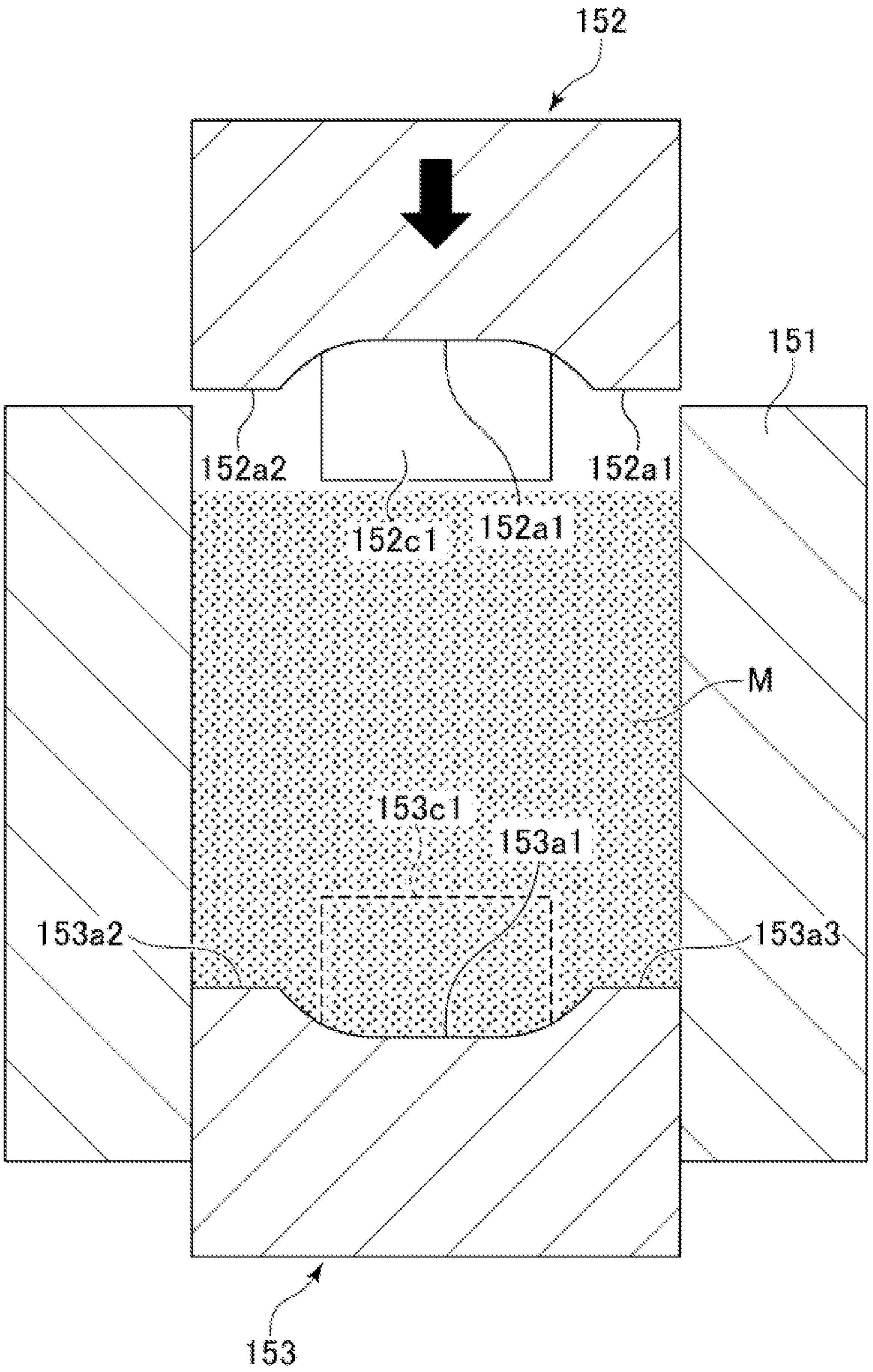
FIG. 14A is a schematic view for explaining a method of manufacturing the dust core shown in FIG. 11.
Figure 14B:
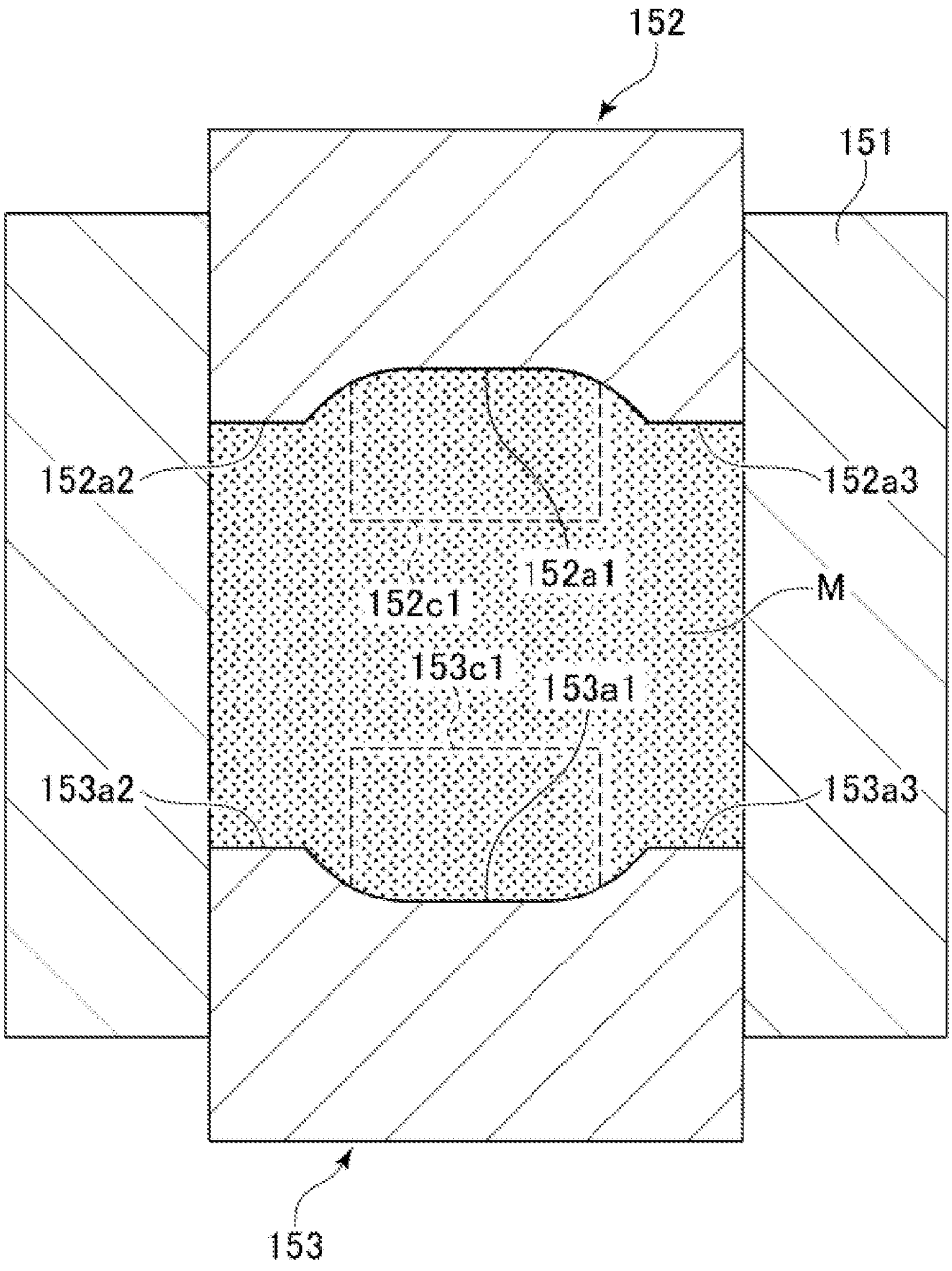
FIG. 14B is a schematic view for explaining the method of manufacturing the dust core shown in FIG. 11.
Figure 14C:
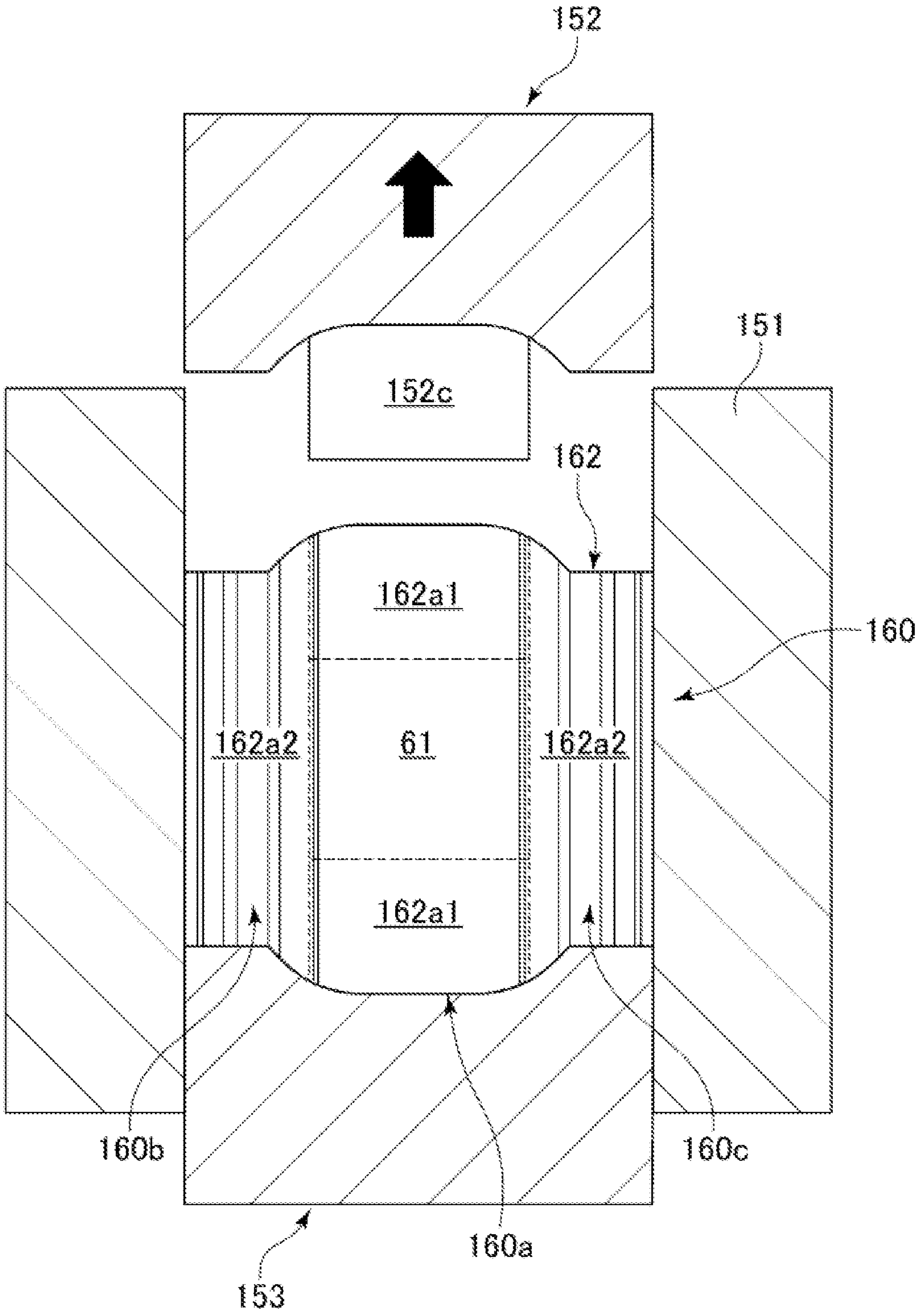
FIG. 14C is a schematic view for explaining the method of manufacturing the dust core shown in FIG. 11.

As with the core 10, the core 110 is produced by uniaxial pressing. The method of manufacturing the core 110 will now be described with reference to FIGS. 13 and 14A to 14C. The core 110 can be manufactured using a uniaxial pressing machine 50. However, the core 110 has a different shape than the core 10, and thus the upper punch 52 is replaced with an upper punch 152, and the lower punch 53 is replaced with a lower punch 153. FIG. 13 schematically shows the upper punch 152 used in the uniaxial pressing machine for producing the core 110. FIGS. 14A to 14C schematically show a section of the uniaxial pressing machine used to manufacture the core 110, cut along the line IV-IV of FIG. 6.

As shown in FIG. 13, the upper punch 152 includes a first portion 152$a$ shaped like a plate, a second portion 152$b$ shaped like a plate, and a projection 152$c$ projecting downward from the connection portion between the first portion 152$a$ and the second portion 152$b$. The first portion 152$a$ has a first pressure surface 152$a$1 shaped flat, a second pressure surface 152$a$2 and a third pressure surface 152$a$3 both shaped flat and positioned below the first pressure surface 152$a$1. The second portion 152$b$ may have generally the same shape as the first portion 152$a$. The projection 152$c$ has a fourth pressure surface 152$c$1 shaped flat.

The lower punch 153 has the same shape as the upper punch 152. Specifically, the lower punch 153 has a first pressure surface 153$a$1 opposed to the first pressure surface 152$a$1, a second pressure surface 153$a$2 opposed to the second pressure surface 152$a$2, and a third pressure surface 153$a$3 opposed to the third pressure surface 152$a$3. The lower punch 153 has a fourth pressure surface 153$c$1 provided on a projection projecting upward, so as to be opposed to the fourth pressure surface 152$c$1.

In the first step to manufacture the core 110, as shown in FIG. 14A, a magnetic material M is filled into the filling space defined by the inner peripheral surface of the die 151 and the upper end surface of the lower punch 153. The magnetic material M is a mixed resin composition formed by mixing soft magnetic metal powder and a resin.

Next, the magnetic material M filled in the filling space is pressurized by the lower punch 153 and the upper punch 152. Specifically, the upper punch 152 is lowered to the position shown in FIG. 14B, such that the magnetic material M is pressurized by the lower punch 153, the upper punch 152, and the die 151, and then the upper punch 152 is raised. Thus, a molded body 160 is obtained which has a shape corresponding to the core 110, as shown in FIG. 14C. The molded body 160 contains a plurality of metal magnetic particles. As shown in FIG. 14C, the molded body 160 includes a winding core portion 61 corresponding to the winding core 11, a first flange portion 162 corresponding to the first flange 12, and a second flange portion corresponding to the second flange 13. Although the second flange portion is not shown, the second flange portion presents the same shape as the first flange portion from the point of view of FIG. 14C. The molded body 160 is heated to obtain the core 110.

The molded body 160 is divided into a plurality of portions compressed to different amounts. Specifically, the molded body 160 is divided into a first region 160$a$ compressed between the first pressure surface 152$a$1 of the upper punch 152 and the first pressure surface 153$a$1 of the lower punch 153, a second region 160$b$ compressed between the second pressure surface 152$a$2 of the upper punch 152 and the second pressure surface 153$a$2 of the lower punch 153, and a third region 160$c$ compressed between the third pressure surface 152$a$3 of the upper punch 152 and the third pressure surface 153$a$3 of the lower punch 153. The second region 160$b$ and the third region 160$c$ are compressed between the second and third pressure surfaces 152$a$2 and 152$a$3 of the upper punch 152 and the second and third pressure surfaces 153$a$2 and 153$a$3 of the lower punch 153. The second and third pressure surfaces 152$a$2 and 152$a$3 of the upper punch 152 are closer to the lower punch 153 than is the first pressure surface 152$a$1, and the second and third pressure surfaces 153*a*2 and 153*a*3 of the lower punch 153 are closer to the upper punch 152 than is the first pressure surface 153*a*1. Thus, the amount of compression of the second region 160*b* and the third region 160*c* is larger than the amount of compression of the first region 160*a*, which is compressed between the first pressure surface 152*a*1 of the upper punch 152 and the first pressure surface 153*a*1 of the lower punch 153. Therefore, the filling factor of the metal magnetic particles in the second region 160*b* and the third region 160*c* is larger than that of the metal magnetic particles in the first region 160*a*. In addition, the metal magnetic particles contained in the second region 160*b* and the third region 160*c* are deformed to a larger amount than the metal magnetic particles contained in the first region 160*a*. Therefore, the flat surface 162*a*2 constituting the surfaces of the second region 160*b* and the third region 160*c* of the molded body 160 is smoother than the flat surface 162*a*1 constituting the surface of the first region 160*a*. Therefore, the flat surface 162*a*1 of the molded body 160 is less smooth than the flat surface 162*a*2 of the molded body 160. Therefore, in the core 110 obtained by heating the molded body 160, the first surface 112*a*1 of the first flange 12 is less smooth than the second surface 12*a*2. For the same reason, the first surface 113*a*1 of the second flange 13 of the core 110 is also less smooth than the second surface 13*a*2.

Figure 15:
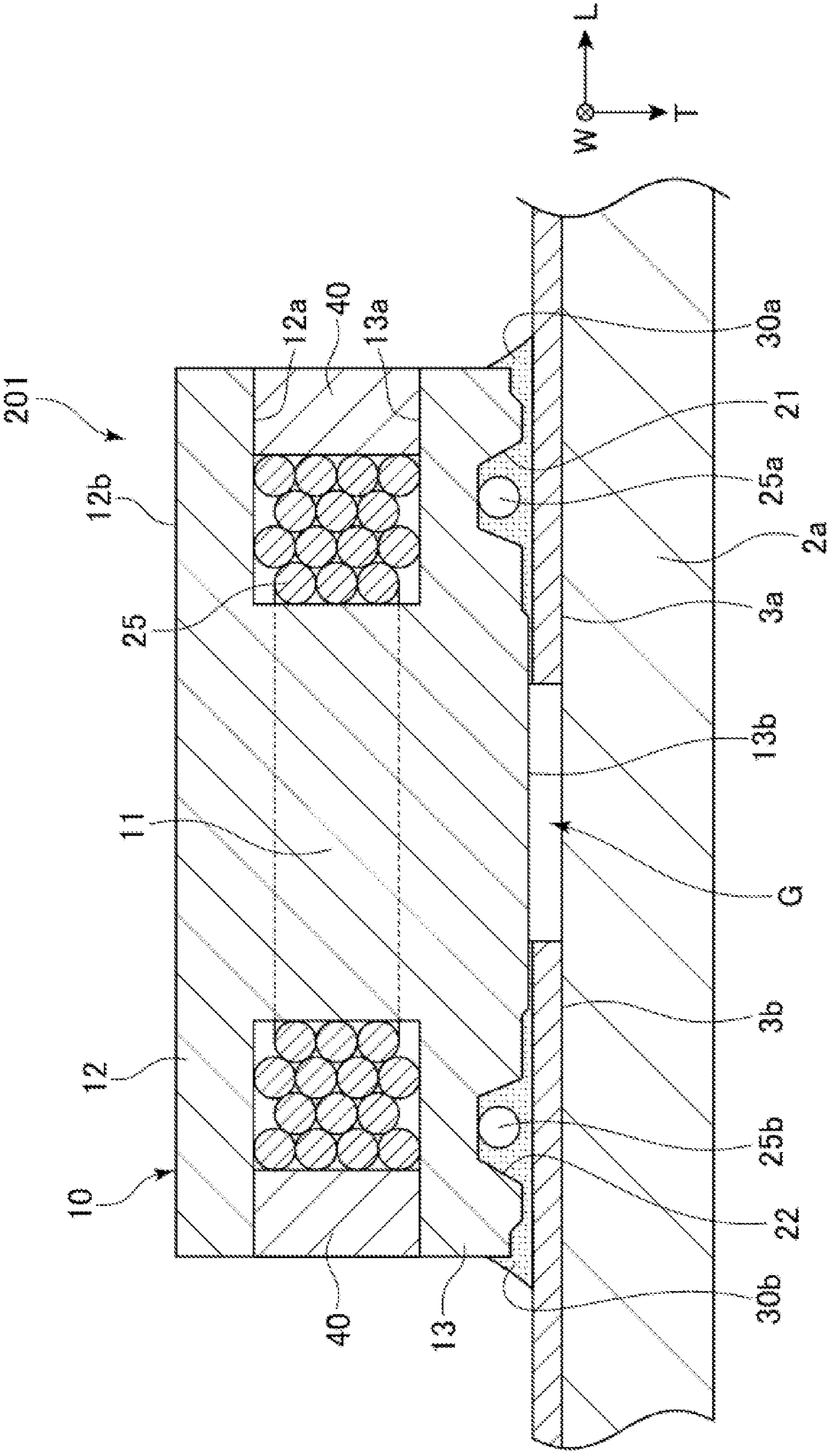
FIG. 15 is a sectional view of a coil component according to another embodiment of the invention.

Next, with reference to FIG. 15, a description is given of a coil component 201 according to another embodiment. The coil component 201 is different from the coil component 1 in that it includes exterior portions 40. The features of the coil component 201 that are the same as those of the coil component 1 will not be described.

The exterior portions 40 are formed by filling the space between the first flange 12 and the second flange 13 with a resin composition containing an insulating resin. The resin material used for the exterior portions 40 may be a resin material with excellent insulating characteristics, such as epoxy resin. The exterior portions 40 fill a part or the whole of the region between the first flange 12 and the second flange 13. The exterior portions 40 cover the conducting wire 25. The exterior portions 40 may contain a filler. The filler is composed of either a magnetic material or a non-magnetic material. The filler is made of ferrite powder, metal magnetic particles, alumina particles, or silica particles so as to lower the coefficient of linear expansion and increase the mechanical strength of the exterior portions 40.

When the resin composition for forming the exterior portions 40 is filled into the space between the first flange 12 and the second flange 13, the resin composition will easily penetrate through the first surface 12*a*1 and the first surface 13*a*1 to the interior of the core 10, because the first surface 12*a*1 of the first flange 12 is rougher than the second surface 12*a*2, and the first surface 13*a*1 of the second flange 13 is rougher than the second surface 13*a*2. In the coil component 201, the area of the first surface 12*a*1 of the first flange 12 is smaller than the area of the second surface 12*a*2, and the area of the first surface 13*a*1 of the second flange 13 is smaller than the area of the second surface 13*a*2, and thus the penetration of the resin composition into the core 10 can be controlled. Thus, since the area of the first surface 12*a*1 is smaller than the area of the second surface 12*a*2 and the area of the first surface 13*a*1 is smaller than the area of the second surface 13*a*2, the tightness can be increased between the exterior portion 40 and the inside surface 12*a* of the first flange 12 and between the exterior portion 40 and the inside surface 13*a* of the second flange 13.

Advantageous effects of the above embodiments will be now described. According to one embodiment of the invention, the inside surface 12*a* of the first flange 12 has a first surface 12*a*1 and a second surface 12*a*2, and the first surface 12*a*1 is less smooth than the second surface 12*a*2. The conducting wire 25 is wound around the winding core 11 so as to be in contact with the inside surface 12*a* of the first flange 12 at the first surface 12*a*1. As described above, the surface resistance of the first surface 12*a*1 is larger than that of the second surface 12*a*2, so that even if the coating material on the conducting wire 25 is damaged by friction with the inside surface 12*a* of the first flange 12 when the conducting wire 25 is wound around the winding core 11, the damaged part of the conducting wire 25 contacts with the inside surface 12*a* at the first surface 12*a*1 having a large surface resistance, and therefore, leakage of current can be inhibited between the conducting wire 25 and the first flange 12 through the damaged part of the coating material on the conducting wire 25.

According to one embodiment of the invention, the first surface 12*a*1 of the inside surface 12*a* of the first flange 12 is positioned closer to the second flange 13 than is the second surface 12*a*2 in the T-axis direction. This arrangement prevents the conducting wire 25 wound to contact with the first surface 12*a*1 from contacting with the second surface 12*a*2.

According to one embodiment of the invention, the winding core 11 is in contact with the first surface 12*a*1 for a length a and in contact with the second surface 12*a*2 for a length b smaller than the length a. This arrangement allows the conducting wire 25 wound around the winding core 11 to be supported by the first surface 12*a*1. Thus, the conducting wire 25 can be prevented from contacting with the second surface 12*a*2.

According to one embodiment of the invention, since the area of the first surface 12*a*1 is smaller than the area of the second surface 12*a*2 and the area of the first surface 13*a*1 is smaller than the area of the second surface 13*a*2, the tightness can be increased between the exterior portion 40 and the inside surface 12*a* of the first flange 12 and between the exterior portion 40 and the inside surface 13*a* of the second flange 13.

The dimensions, materials, and arrangements of the constituent elements described herein are not limited to those explicitly described for the embodiments, and these constituent elements can be modified to have any dimensions, materials, and arrangements within the scope of the present invention. Furthermore, constituent elements not explicitly described herein can also be added to the described embodiments, and it is also possible to omit some of the constituent elements described for the embodiments. For example, it is also possible that the second flange 13 does not have the first surface 13*a*1. In this case, the inside surface 13*a* of the second flange 13 is a flat surface having an almost uniform smoothness. If the conducting wire 25 is disposed closer to the first flange 12 and does not contact with the second flange 13, the second flange 13 does not need to have the first surface 13*a*1.

One or more of the steps of the manufacturing method described herein can be omitted as appropriate as long as there is no contradiction. In the manufacturing method described herein, steps not described explicitly in this specification may be performed as necessary. One or more of the steps included in the above-described manufacturing method may be performed in different orders without departing from the spirit of the invention. One or more of the steps included in the above-described manufacturing method may be performed at the same time or in parallel, if possible.

The words "first," "second," "third" and so on used herein are added to distinguish constituent elements but do not necessarily limit the numbers, orders, or contents of the constituent elements. The numbers added to distinguish the constituent elements should be construed in each context. The same numbers do not necessarily denote the same constituent elements among the contexts. The use of numbers to identify constituent elements does not prevent the constituent elements from performing the functions of the constituent elements identified by other numbers.

This specification also discloses the following embodiments.

A coil component comprising: a dust core including a first flange, a second flange, and a winding core, the first flange having an inside surface including a first surface and a second surface, the second flange being opposed to the inside surface of the first flange, the winding core extending in an axial direction and connecting the first flange and the second flange, the dust core being formed of a plurality of metal magnetic particles bonded to each other via insulating material, the first surface being less smooth than the second surface; and a conducting wire wound around the winding core so as to be in contact with the inside surface at the first surface.

The coil component of [1], wherein the first surface is positioned closer to the second flange than is the second surface in the core axis direction.

The coil component of [1] or [2], wherein the conducting wire is not in contact with the second surface.

The coil component of any one of [1] to [3], wherein the winding core is in contact with the first surface for a first length and in contact with the second surface for a second length smaller than the first length.

The coil component of any one of [1] to [4], wherein the first surface is divided into a first region and a second region, and the first region is located opposite the second region with respect to the winding core.

The coil component of any one of [1] to [5], wherein a first area expressing an area of the first surface is smaller than a second area expressing an area of the second surface.

The coil component of any one of [1] to [6], an exterior portion containing a resin and provided between the first flange and the second flange so as to cover the conducting wire.

The coil component of any one of [1] to [7], wherein a first Sa, an arithmetic mean roughness of the first surface, is two or more times as large as a second Sa, an arithmetic mean roughness of the second surface.

The coil component of any one of [1] to [8], wherein a first Sa, an arithmetic mean roughness of the first surface, is $\frac{1}{20}$ or larger of an average particle size of the plurality of metal magnetic particles.

The coil component of any one of [1] to [9], wherein the second flange has a second inside surface and an outside surface, the second inside surface is opposed to the inside surface of the first flange, and the outside surface is opposed to the second inside surface and is less smooth than the second surface, and wherein the coil component further comprises an external electrode provided on the outside surface of the second flange and electrically connected to the conducting wire.

The coil component of any one of [1] to [10], wherein the first surface is oblique to the second surface.

The coil component of any one of [1] to [11], wherein the first surface extends parallel to the second surface.

A method of manufacturing a coil component, comprising:

filling a filling space defined by an inner peripheral surface of a die and an upper end surface of a lower punch with a mixed resin composition formed by mixing soft magnetic metal powder and a resin;

compressing the mixed resin composition by moving an upper punch having a sloping surface oblique to one axial direction toward the lower punch along the one axial direction, so as to obtain a compression-molded body having a first surface extending along the sloping surface and a second surface extending along the one axial direction, the first surface being less smooth than the second surface;

heating the compression-molded body to obtain a dust core; and winding a conducting wire around the dust core so as to contact with the first surface.

A method of manufacturing a coil component, comprising:

filling a cavity defined by an inner peripheral surface of a die and an upper end surface of a lower punch with a mixed resin composition formed by mixing soft magnetic metal powder and a resin;

compressing the mixed resin composition by moving an upper punch having a first pressure surface and a second pressure surface positioned closer to the lower punch than is the first pressure surface toward the lower punch along one axial direction, so as to obtain a compression-molded body including a first region and a second region, the first region having a first surface compressed by the first pressure surface and extending along the one axial direction, the second region having a second surface compressed by the second pressure surface and extending along the one axial direction, the first surface being less smooth than the second surface;

heating the compression-molded body to obtain a dust core; and winding a conducting wire around the dust core so as to contact with the first surface.

What is claimed is:

1. A coil component comprising:

a dust core including a first flange, a second flange, and a winding core, the first flange having an inside surface including a first surface and a second surface, the second flange being opposed to the inside surface of the first flange, the winding core extending in a core axis direction and connecting the first flange and the second flange, the dust core being formed of a plurality of metal magnetic particles bonded to each other via insulating material, the first surface being less smooth than the second surface;

a conducting wire wound around the winding core so as to be in contact with the inside surface at the first surface; and wherein a first Sa, an arithmetic mean roughness of the first surface, is two or more times as large as a second Sa, an arithmetic mean roughness of the second surface.

2. The coil component of claim 1, wherein the first surface is positioned closer to the second flange than is the second surface in the core axis direction.

3. The coil component of claim 1, wherein the conducting wire is not in contact with the second surface.

4. The coil component of claim 1, wherein the winding core is in contact with the first surface for a first length and in contact with the second surface for a second length smaller than the first length.

5. The coil component of claim 1, wherein the first surface is divided into a first region and a second region, and the first region is located opposite the second region with respect to the winding core.

6. The coil component of claim 4, wherein a first area expressing an area of the first surface is smaller than a second area expressing an area of the second surface.

7. The coil component of claim 6, further comprising: an exterior portion containing a resin and provided between the first flange and the second flange so as to cover the conducting wire.

8. The coil component of claim 1, wherein a first Sa, an arithmetic mean roughness of the first surface, is 1/20 or larger of an average particle size of the plurality of metal magnetic particles.

9. The coil component of claim 1, wherein the second flange has a second inside surface and an outside surface, the second inside surface is opposed to the inside surface of the first flange, and the outside surface is opposed to the second inside surface and is less smooth than the second surface, and wherein the coil component further comprises an external electrode provided on the outside surface of the second flange and electrically connected to the conducting wire.

10. The coil component of claim 1, wherein the first surface is oblique to the second surface.

11. The coil component of claim 1, wherein the first surface extends parallel to the second surface.

12. A method of manufacturing a coil component, comprising:

filling a filling space defined by an inner peripheral surface of a die and an upper end surface of a lower punch with a mixed resin composition formed by mixing soft magnetic metal powder and a resin;

compressing the mixed resin composition by moving an upper punch having a sloping surface oblique to one axial direction toward the lower punch along the one axial direction, so as to obtain a compression-molded body having a first surface extending along the sloping surface and a second surface extending along the one axial direction, the first surface being less smooth than the second surface;

heating the compression-molded body to obtain a dust core;

winding a conducting wire around the dust core so as to contact with the first surface; and wherein a first Sa, an arithmetic mean roughness of the first surface, is two or more times as large as a second Sa, an arithmetic mean roughness of the second surface.

13. A method of manufacturing a coil component, comprising:

filling a cavity defined by an inner peripheral surface of a die and an upper end surface of a lower punch with a mixed resin composition formed by mixing soft magnetic metal powder and a resin;

compressing the mixed resin composition by moving an upper punch having a first pressure surface and a second pressure surface positioned closer to the lower punch than is the first pressure surface toward the lower punch along one axial direction, so as to obtain a compression-molded body including a first region and a second region, the first region having a first surface compressed by the first pressure surface and extending along the one axial direction, the second region having a second surface compressed by the second pressure surface and extending along the one axial direction, the first surface being less smooth than the second surface;

heating the compression-molded body to obtain a dust core;

winding a conducting wire around the dust core so as to contact with the first surface; and wherein a first Sa, an arithmetic mean roughness of the first surface, is two or more times as large as a second Sa, an arithmetic mean roughness of the second surface.

* * * * *